United States Patent [19]

Takatori et al.

[11] Patent Number: 5,796,456
[45] Date of Patent: Aug. 18, 1998

[54] LIQUID CRYSTAL DISPLAY WITH OPTICAL NEGATIVE UNI-AXIAL COMPENSATION LAYER

[75] Inventors: Ken-ichi Takatori; Masayoshi Suzuki; Ken Sumiyoshi; Hideya Murai, all of Tokyo, Japan

[73] Assignee: NEC Corporation, Tokyo, Japan

[21] Appl. No.: 679,676

[22] Filed: Jul. 12, 1996

[30] Foreign Application Priority Data

Jul. 14, 1995 [JP] Japan ................... 7-201685
May 15, 1996 [JP] Japan ................... 8-120085

[51] Int. Cl.[6] .................. G02F 1/1335; G02F 1/1337
[52] U.S. Cl. ............... 349/117; 349/118; 349/119; 349/129
[58] Field of Search .................. 349/117, 118, 349/119, 129

[56] References Cited

U.S. PATENT DOCUMENTS 5,568,290 10/1996 Nakamura ................... 349/117
5,576,863 11/1996 Aoki et al. .................. 349/117
5,594,568 1/1997 Abileah et al. .............. 349/119
5,602,661 2/1997 Schadt et al. ................ 349/117
5,619,352 4/1997 Koch et al. .................. 349/119
5,710,611 1/1998 Suzuki et al. ................ 349/129

Primary Examiner—William L. Sikes
Assistant Examiner—Walter Malinowski
Attorney, Agent, or Firm—Young & Thompson

[57] ABSTRACT

A liquid crystal display has a plurality of pairs of top and bottom pixel electrodes, each of which has a plurality of sub-areas to which different voltages are applied, wherein at least any one of the top and bottom pixel electrodes has an optical compensation layer which has an optically negative uni-axial structure. The liquid crystal display may have a liquid crystal layer which has co-existing different domains differing in the twisted direction and the tilting up direction of the liquid crystal and at least an optical compensation layer having a bi-axial refractive anisotropy between the liquid crystal layer and the polarization plate, wherein the bi-axial refractive anisotropy of the optical compensation layer has three different refractive indexes $n_x$, $n_y$, $n_z$ which satisfy the relationship of $n_x > n_y > n_z$ where $n_x$ is the refractive index in a direction parallel to an X-axis parallel to a surface of the optical compensation layer, $n_y$ is the refractive index in a direction parallel to a Y-axis parallel to a surface of the optical compensation layer and perpendicular to the X-axis, and $n_z$ is the refractive index in a direction parallel to a Z-axis perpendicular to a surface of the optical compensation layer.

13 Claims, 18 Drawing Sheets co-existing four different domains which differ both in the twisting direction and in the tilting up direction liquid crystal layer | exact optical compensation layer | approximated optical compensation layer co-existing four different domains which differ both in the twisting direction and in the tilting up direction $n_x > n_y > n_z$ co-existing four different domains which differ both in the twisting direction and in the tilting up direction

LIQUID CRYSTAL DISPLAY WITH OPTICAL NEGATIVE UNI-AXIAL COMPENSATION LAYER

BACKGROUND OF THE INVENTION

The present invention relates to a liquid crystal display, and more particularly to an improved twisted nematic liquid crystal display with a wide viewing angle and a high contrast property.

The twisted nematic liquid crystal displays have been used, which however has a problem in a narrow viewing angle. The narrow viewing angle of the twisted nematic liquid crystal is caused by the property of tilt-up of twisted nematic liquid crystal molecules. The twisted nematic liquid crystal molecules have generally slender shapes with a longitudinal axis which decides an orientation of the twisted nematic liquid crystal molecules. If no voltage is applied to the twisted nematic liquid crystal molecules, then the twisted nematic liquid crystal molecules are ordered so that the longitudinal axis is almost parallel to substrates which sandwich the twisted nematic liquid crystal. If a voltage is applied to the twisted nematic liquid crystal molecules, then the twisted nematic liquid crystal molecules are likely to tilt up. In order to obtain a uniform picture, it is required that, on an entire part of the screen of the display, the twisted nematic liquid crystal molecules are made tilt up from the left sides thereof.

As illustrated in FIG. 1, if the view angle tilts toward the left side from the axis normal to the screen of the display so that an angle defined between the direction of the view and the longitudinal axis of the twisted nematic liquid crystal molecule becomes large, then the tilting-up twisted nematic liquid crystal molecules appear to be long. If, however, the view angle tilts toward the right side from the axis normal to the screen of the display so that an angle defined between the direction of the view and the longitudinal axis of the twisted nematic liquid crystal molecule becomes small, then the tilting-up twisted nematic liquid crystal molecules appear to be long. Those phenomenon are caused by variations in the refractive index of the twisted nematic liquid crystal. Such view angle dependency is caused by the variation of the refractive index of the twisted nematic liquid crystal.

In order to settle the above problems with the view angle dependency, it was proposed to do a division of pixels in "Active-matrix LCDs using gray-scale in halftone method" 1989, SID International Symposium Digest of Technical Papers, Vol. 20, p. 148. Similar methods are also disclosed in the Japanese Laid-open Patent Publications Nos. 2-12 and 3-122621. In the Japanese Laid-open Patent Publication No. 2-12, it is disclosed that each pixel is provided with a plurality of sub-pixels which are connected to control capacitors so that ignitions of the sub-pixels accord functions of voltage applied to the pixel electrode to obtain a gray scale display.

It has also been proposed that, as illustrated in FIG. 2, first and second sub-pixels are coupled to each other via a coupling capacitor so that the first and second sub-pixels are applied with different voltages. For this reason, in the normally black mode, each of the first and second sub-pixels possesses variation in transmittivity over applied voltage as illustrated in FIG. 3.

In general, however, if no voltage is applied to the twisted nematic liquid crystal, the view angle dependency is not remarkable, for which reason it is possible to obtain a relaxation of the view angle dependency in a dark gray scale level by suitably selecting a ratio in area of the first sub-pixel to the second sub-pixel. Namely, the above conventional twisted nematic liquid crystal display used in the normally black mode has unremarkable view angle dependency when the picture is dark.

In order to obtain a high contrast of the picture, the twisted nematic liquid crystal display may, however, be used in the normally white mode. In this case, the twisted nematic liquid crystal display used in the normally white mode that has unremarkable view angle dependency has a remarkable view angle dependency when the picture is dark.

Even if the above divisional method is applied to the twisted nematic liquid crystal display operable in the normally white mode, it is difficult to settle the above remarkable view angle dependency.

It had been required to develop an improved twisted nematic liquid crystal display free from the above problem in the remarkable view angle dependency.

Further, in order to settle the above problem with the remarkable view angle dependency engaged to the twisted nematic liquid crystal display operable in the normally white mode, a micro-rubbing technique is available, which is, for example, disclosed in the Japanese Laid-open Patent Publication No. 63-106624.

As illustrated in FIG. 4, a pair of top and bottom substrates 33 and 23 is subjected to a micro-rubbing treatment in four different directions. The bottom substrate 23 has a plurality of alternating first and second stripe regions arranged in parallel to each other. The first and second stripe regions of bottom substrate 23 are subjected to micro-rubbing treatments in opposite directions respectively, both of which are perpendicular to a longitudinal direction of the first and second stripe regions. The top substrate 33 has a plurality of alternating first and second stripe regions arranged in parallel to each other. The first and second stripe regions of the top substrate 33 are also subjected to micro-rubbing treatments in opposite directions respectively, both of which are, however, parallel to the longitudinal direction of the first and second stripe regions. As a result, a selected one of the first and second regions is suitably used to settle the problem with the remarkable view angle dependency.

In addition, there has been known a method for making the twisted nematic liquid crystal molecules spontaneously tilt up in different directions without using the above rubbing technique. This method is disclosed in the Japanese Patent Application No. 7-273614. For example, four different domains A, B, C and D which differ in tilting up direction of the twisted nematic liquid crystal molecules coexist in the single pixel as illustrated in FIG. 5.

Furthermore, there has been known a method for using a compensation film to settle the above problem with the remarkable view angle dependency of the twisted nematic liquid crystal molecules. An optical compensation film is provided between the liquid crystal layer and the polarization plate so as to adjust an anisotropy of refractive index, which appears when an oblique incidental light appears, whereby a relatively wide view angle can be obtained. For a particular purpose of compensation of optical property of the twisted nematic liquid crystal molecules which are about to tilt up by a commenced voltage application, there was proposed an optical compensation film having an optical axis which is twisted relative to the surface of the substrate. In the Japanese Laid-open Patent Publication No. 7-120746, there is disclosed a bi-axial phase difference optical compensation film.

It was confirmed by the inventor that the twisted nematic liquid crystal display, where a plurality of different domains differing in the tilting up direction of the twisted nematic liquid crystal molecules are formed in each pixel, is likely to possess an optical property that is superior to an optical property of the other twisted nematic liquid crystal display, where a single domain uniform in the tilting up direction of the twisted nematic liquid crystal molecules is formed in each pixel.

A twisted nematic liquid crystal display, having co-existing different domains which differ both in the twisting direction and in the tilting up direction of the twisted nematic liquid crystal molecules, shows no gray scale inversion and possesses a relatively wide viewing angle. There is, however, a problem in that in the black picture obtained upon the voltage application to the twisted nematic liquid crystal, a transmittivity of the oblique incidental light remains relatively high and it is difficult to make this transmittivity sufficiently low. Namely, whiteness appears on the picture which should be black. This makes it difficult to obtain a high contrast picture. Since such a twisted nematic liquid crystal display has co-existing different domains which differ both in the twisting direction and in the tilting up direction of the twisted nematic liquid crystal molecules, it is also difficult to sufficiently compensate the whiteness upon the optical compensation firm having the tilt and the twist.

It had been required to develop an improved twisted nematic liquid crystal display free from the above problem in deterioration of the viewing property and in reduction of the contrast of the picture, provided that the twisted nematic liquid crystal has co-existing different domains which differ both in the twisting direction and in the tilting up direction of the twisted nematic liquid crystal molecules.

SUMMARY OF THE INVENTION

Accordingly, it is an object of the present invention to provide an improved twisted nematic liquid crystal display free from the above problem in the remarkable view angle dependency.

It is a further object of the present invention to provide an improved twisted nematic liquid crystal display being operable in a normally white mode and having a suppressed view angle dependency over any applied voltage levels when a picture is dark.

It is a furthermore object of the present invention to provide an improved twisted nematic liquid crystal display free from the above problem in the deterioration of the viewing property, provided that the twisted nematic liquid crystal has co-existing different domains which differ both in the twisting direction and in the tilting up direction of the twisted nematic liquid crystal molecules.

It is still a further object of the present invention to provide an improved twisted nematic liquid crystal display free from the above problem in reduction of the contrast of the picture, provided that the twisted nematic liquid crystal has co-existing different domains which differ both in the twisting direction and in the tilting up direction of the twisted nematic liquid crystal molecules.

The above and other objects, features and advantages of the present invention will be apparent from the following descriptions.

The present invention provides a liquid crystal display which has a plurality of pairs of top and bottom pixel electrodes, each of which has a plurality of sub-areas to which different voltages are applied, wherein at least any one of the top and bottom pixel electrodes has an optical compensation layer which has an optically negative uniaxial structure.

The present invention also provides a liquid crystal display having a liquid crystal layer which has co-existing different domains differing in the twisted direction and the tilting up direction of the liquid crystal and at least an optical compensation layer having a bi-axial refractive anisotropy between the liquid crystal layer and the polarization plate, wherein the bi-axial refractive anisotropy of the optical compensation layer has three different refractive indexes $n_x$, $n_y$, $n_z$ which satisfy the relationship of $n_x > n_y > n_z$ where $n_x$ is the refractive index in a direction parallel to an X-axis parallel to a surface of the optical compensation layer, $n_y$ is the refractive index in a direction parallel to a Y-axis parallel to a surface of the optical compensation layer and perpendicular to the X-axis, and $n_z$ is the refractive index in a direction parallel to a Z-axis perpendicular to a surface of the optical compensation layer.

BRIEF DESCRIPTIONS OF THE DRAWINGS

Preferred embodiments according to the present invention will be described in detail with reference to the accompanying drawings.

DISCLOSURE OF THE INVENTION

In order to achieve the above objects, a liquid crystal display according to the present invention has a plurality of pairs of top and bottom pixel electrodes each of which has a plurality of sub-areas to which different voltages are applied, wherein at least any one of the top and bottom pixel electrodes has an optical compensation layer which has an optically negative uni-axial structure.

The above liquid crystal display uses a twisted nematic liquid crystal.

It is preferable that each pixel electrode is divided into sub-areas having different capacitances from each other.

Additionally, the optically negative axis of the optical compensation may tilt against an axis normal to the surface of the optical compensation layer.

It is preferable that the optically negative axes of the optical compensation layer uniformly tilt against the axis normal to the surface of the optical compensation layer.

It is further preferable that two of the optical compensation layer, which uniformly tilt against the axis normal to the surface of the optical compensation layer, are provided for either the top or bottom substrates or both so that the direction of each of their respective optical axes almost correspond to the direction of the liquid crystal when a voltage is applied to the liquid crystal.

It is furthermore preferable that two of the optical compensation layers, which uniformly tilt against the axis normal to the surface of the optical compensation layer, are provided for either the top or bottom substrates or both so that the mean direction of the optical axes almost correspond to the direction of the liquid crystal when a voltage is applied to the liquid crystal.

Figure 6:
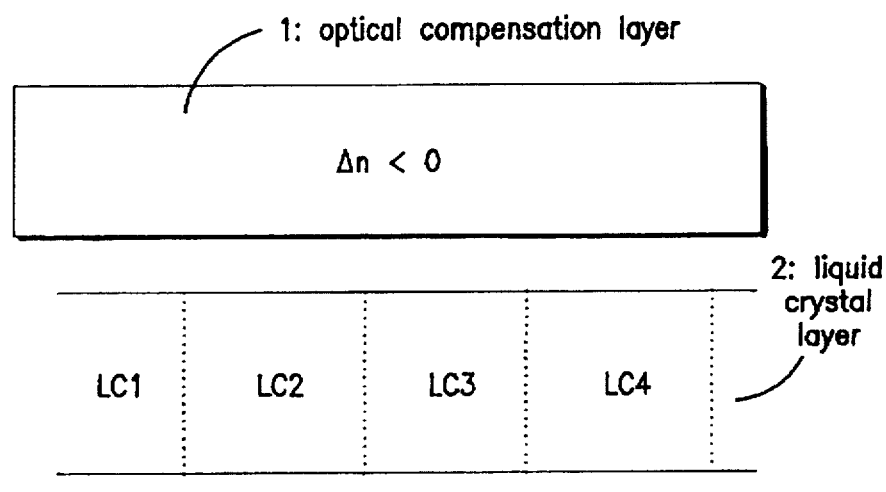
FIG. 6 is a view illustrative of a principal of an improved twisted nematic liquid crystal display according to the present invention.

With reference to FIG. 6, the operation of the liquid crystal display will be described. Each pixel electrode is divided into sub-pixels which are applied with different voltages. The liquid crystal layer 2 is also divided into sub-domains LC1, LC2, LC3 and LC4 which correspond to the sub-pixels so that the sub-domains LC1, LC2, LC3 and LC4 of the liquid crystal layer 2 are applied with different voltages.

The above present invention provides at least an optical compensation layer which relaxes a view angle dependency in the black picture over any voltage levels without limiting the normally black mode.

The optical compensation layer according to the present invention realizes the black picture over any applied voltage levels and improves the view angle dependency.

The optical compensation layer according to the present invention has a structure as follows.

If the voltage is applied to the liquid crystal, the orientation of the liquid crystal is strained in the direction of thickness of the cell of the liquid crystal. The liquid crystal molecule has a positive refractive index anisotropy Δ n. The magnitude of the positive refractive index anisotropy depends upon the length of the liquid crystal molecule.

Figure 7:
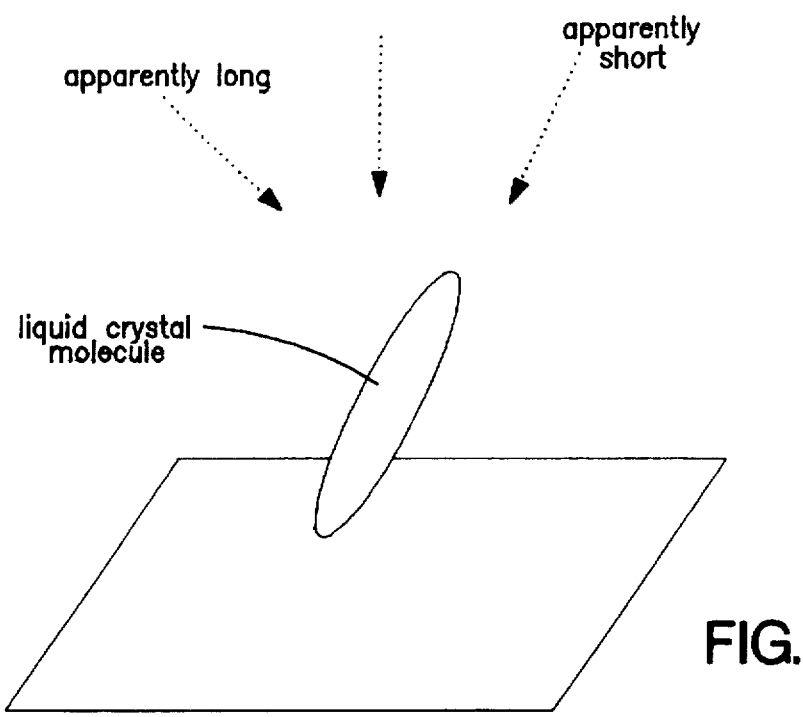
FIG. 7 is a view illustrative of a view angle dependency of a twisted nematic liquid crystal.

If the voltage is applied to the liquid crystal, the liquid crystal molecules tilt up as illustrated in FIG. 7. If the view angle tilts toward the left side from the axis normal to the screen of the display so that an angle defined between the direction of the view and the longitudinal axis of the twisted nematic liquid crystal molecule becomes large, then the tilting-up twisted nematic liquid crystal molecules appear to be long. If, however, the view angle tilts toward the right side from the axis normal to the screen of the display so that an angle defined between the direction of the view and the longitudinal axis of the twisted nematic liquid crystal molecule becomes small, then the tilting-up twisted nematic liquid crystal molecules appear to be long. Those phenomenon are caused by variations in the refractive index of the twisted nematic liquid crystal. Such view angle dependency is caused by the variation of the refractive index of the twisted nematic liquid crystal.

Figure 8:
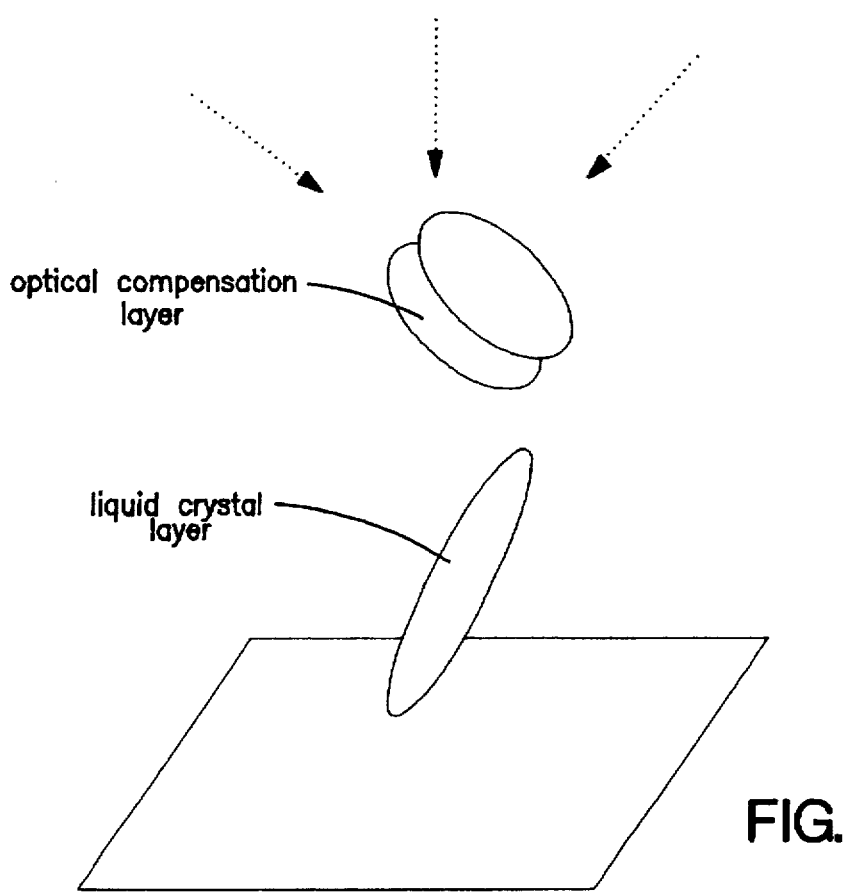
FIG. 8 is a view illustrative of a view angle dependency versus an optical compensation layer and an orientation of a twisted nematic liquid crystal molecule in an improved twisted nematic liquid crystal display according to the present invention.

The optical compensation layer having a negative refractive anisotropy is disposed over the liquid crystal. As illustrated in FIG. 8, the optical compensation layer is disposed in relation to the liquid crystal so that the optical axes or the longitudinal axes of the liquid crystal molecules are parallel to an optical axis of the optical compensation layer. The optical axis of the optical compensation layer is identical with the axis normal to a disk illustrated in FIG. 8. In this case, even if the viewing angle is varied, an amount of the double refraction as a total of both the liquid crystal layer and the optical compensation layer remains unchanged since the signs of the refractive anisotropy of the liquid crystal and the optical compensation layer are opposite to each other.

Figure 9:
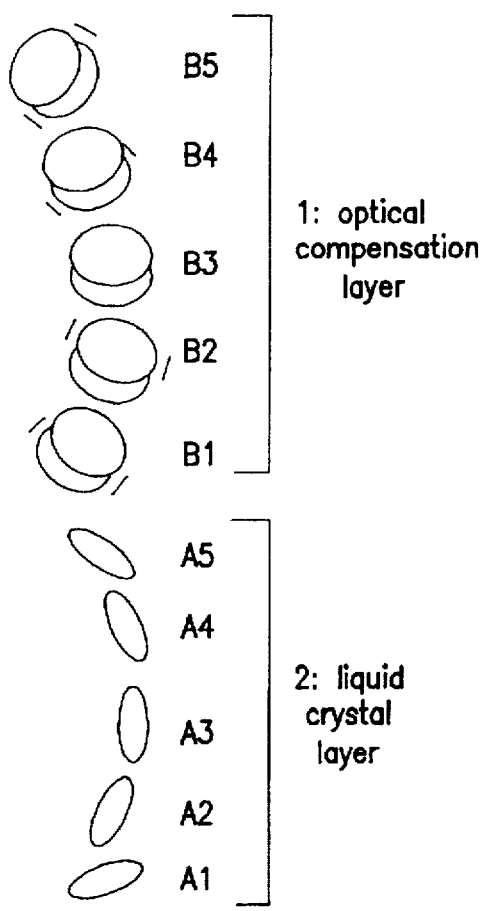
FIG. 9 is a view illustrative of relationships in orientation between an optical compensation layer and a twisted nematic liquid crystal molecule in an improved twisted nematic liquid crystal display according to the present invention.

Whereas the above descriptions have been made by assuming that the orientations of the liquid crystal molecules are ordered, actually however the orientations of the liquid crystal molecules are varied, for which reason it is necessary to have the optical axis of the optical compensation layer accord to the various orientations of the liquid crystal molecules as illustrated in FIG. 9. The liquid crystal layer 2 is divided into five sub-layers A1, A2, A3, A4 and A5. The optical compensation layer 1 is divided into five sub-layers which respectively have different optical axes B1, B2, B3, B4 and B5 which are responsible for the five sub-layers A1, A2, A3, A4 and A5.

Namely, a first optical compensation sub-layer B1 has a first optical axis which is parallel to the optical axis or the longitudinal direction of the liquid crystal molecules in the first sub-layer A1 in the liquid crystal layer 2. A second optical compensation sub-layer B2 has a second optical axis which is parallel to the optical axis or the longitudinal direction of the liquid crystal molecules in the second sub-layer A2 in the liquid crystal layer 2. A third optical compensation sub-layer B3 has a third optical axis which is parallel to the optical axis or the longitudinal direction of the liquid crystal molecules in the third sub-layer A3 in the liquid crystal layer 2. A fourth optical compensation sub-layer B4 has a fourth optical axis which is parallel to the optical axis or the longitudinal direction of the liquid crystal molecules in the fourth sub-layer A4 in the liquid crystal layer 2. A fifth optical compensation sub-layer B5 has a fifth optical axis which is parallel to the optical axis or the longitudinal direction of the liquid crystal molecules in the fifth sub-layer A5 in the liquid crystal layer 2.

Figure 10:
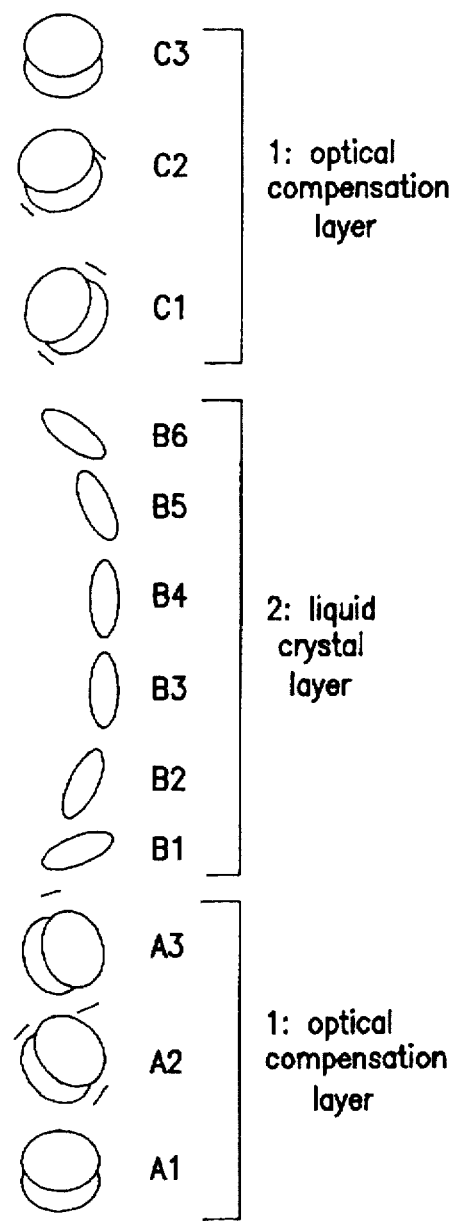
FIG. 10 is a view illustrative of relationships in orientation between another optical compensation layer and a twisted nematic liquid crystal molecule in an improved twisted nematic liquid crystal display according to the present invention.

As illustrated in FIG. 10, the liquid crystal layer 2 may be sandwiched between top and bottom optical compensation layers 1. The liquid crystal layer 2 is divided into six sub-layers B1, B2, B3, B4, B5 and B6. The bottom optical compensation layer 1 is divided into three sub-layers A1, A2 and A3 which respectively have different optical axes. The top optical compensation layer 1 is divided into three sub-layers C1, C2 and C3 which respectively have different optical axes.

Namely, a first optical compensation sub-layer A1 has a first optical axis which is parallel to the optical axis or the longitudinal direction of the liquid crystal molecules in the third sub-layer B3 in the liquid crystal layer 2. A second optical compensation sub-layer A2 has a second optical axis which is parallel to the optical axis or the longitudinal direction of the liquid crystal molecules in the second sub-layer B2 in the liquid crystal layer 2. A third optical compensation sub-layer A3 has a first optical axis which is parallel to the optical axis or the longitudinal direction of the liquid crystal molecules in a third sub-layer A1 in the liquid crystal layer 2. A first optical compensation sub-layer C1 has a first optical axis which is parallel to the optical axis or the longitudinal direction of the liquid crystal molecules in the sixth sub-layer B6 in the liquid crystal layer 2. A second optical compensation sub-layer C2 has a second optical axis which is parallel to the optical axis or the longitudinal direction of the liquid crystal molecules in the fifth sub-layer B5 in the liquid crystal layer 2. A third optical compensation sub-layer C3 has a first optical axis which is parallel to the optical axis or the longitudinal direction of the liquid crystal molecules in a fourth sub-layer A4 in the liquid crystal layer 2.

Optical properties of the above liquid crystal displays illustrated in FIGS. 9 and 10 will be described.

In the liquid crystal displays, a linearly polarized light is injected into the liquid crystal layer. Immediately after the light has passed through the liquid crystal layer, the light is elliptically polarized light. If the elliptically polarized light enters into the optical compensation layer, then the elliptically polarized light becomes the linearly polarized light. For which reason, the light having passed through the optical compensation layer is the linearly polarized light. Therefore, if either one of the above structures illustrated in FIGS. 9 and 10 is disposed between two polarization plates which directions are perpendicular to each other, then the black picture can be obtained.

Whereas the above descriptions have been made in the transverse incidence of the light to the liquid crystal, the above descriptions may be applicable to in the case of the oblique incidence of the light thereto whereby the problem with variations of the double refraction over view angle can be settled.

As described above, the view angle dependency of the liquid crystal is settled by the optical compensation layer having the negative optical anisotropy.

In place of using the optical compensation layer having optical layered structure exactly according to the various orientations of the liquid crystal, an alternatively optical compensation layer having optical layered structure may be used which approximately accords to the various orientations of the liquid crystal.

Figure 11:
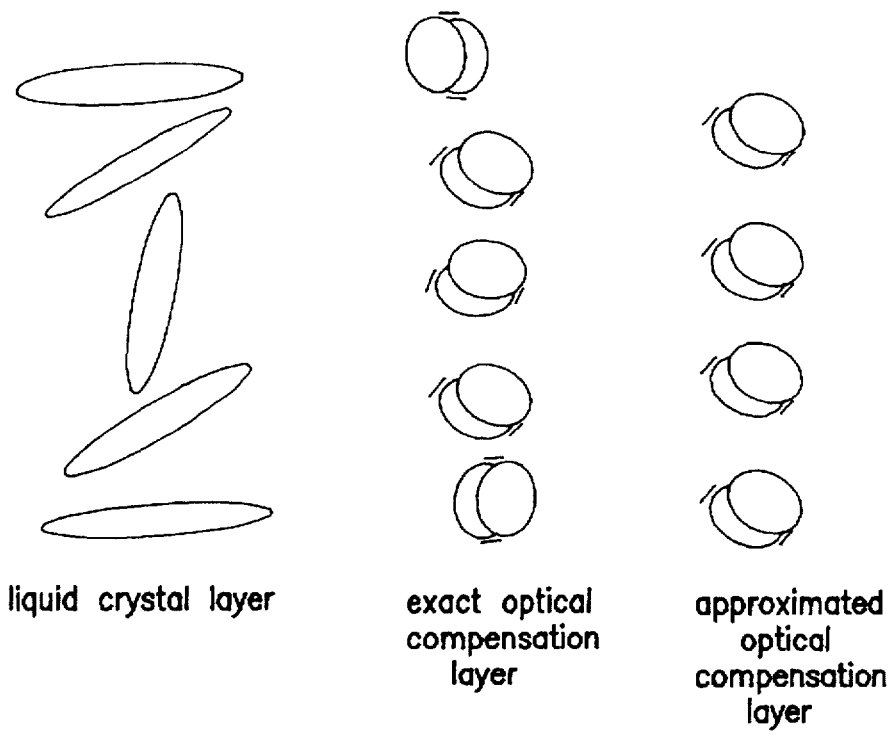
FIG. 11 is a view illustrative of relationships in orientation between still another optical compensation layer and a twisted nematic liquid crystal molecule in an improved twisted nematic liquid crystal display according to the present invention.

As illustrated in FIG. 11, even if the orientations of the liquid crystal are varied, it is available to use the optical compensation layer having the approximated layered structure having a uniform optical axis, instead of the optical compensation layer having the exact layered structure.

Alternatively, the optical compensation layer having the approximated layered structure having optical axes varying in tilting angle may be used instead of the optical compensation layer having the exact layered structure.

In the above case, it is necessary that the top and bottom optical compensation layers have the same double refractive index.

The above optical compensation layers may be formed by applying shear force to a film as disclosed in the Japanese laid-open patent application No. 6-222213.

The present invention also provides a liquid crystal display having a liquid crystal layer which has co-existing different domains differing in the twisted direction and the tilting up direction of the liquid crystal and at least an optical compensation layer having a bi-axial refractive anisotropy between the liquid crystal layer and the polarization plate, wherein the bi-axial refractive anisotropy of the optical compensation layer has three different refractive indexes $n_x$, $n_y$, $n_z$ which satisfy the relationship of $n_x > n_y > n_z$ where $n_x$ is the refractive index in a direction parallel to an X-axis parallel to a surface of the optical compensation layer, $n_y$ is the refractive index in a direction parallel to a Y-axis parallel to a surface of the optical compensation layer and perpendicular to the X-axis, and $n_z$ is the refractive index in a direction parallel to a Z-axis perpendicular to a surface of the optical compensation layer.

It is preferable to use the above optical compensation layer for the liquid crystal display having co-existing four different domains which differ in the twisted direction and the tilting up direction.

It is also preferable that a pair of transparent substrates is provided so that the substrates are parallel to each other and have respective surfaces facing each other and being provided with transparent electrodes and orientation films which have different rubbing directions by 90 degrees from each other. A nematic liquid crystal is disposed between the orientation films. A pair of polarization plates are provided to sandwich the transparent substrates. At least one optical compensation layer described above is provided between the polarization plate and the transparent substrate.

Figure 12:
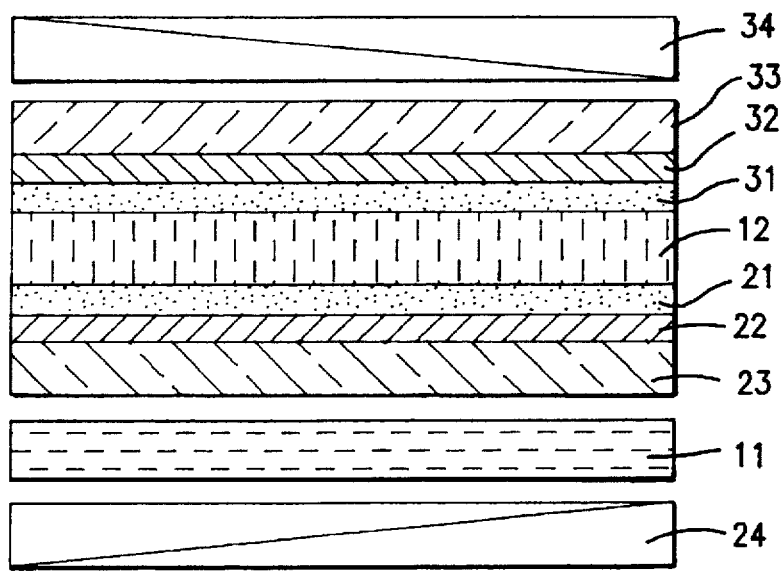
FIG. 12 is a fragmentary cross sectional elevation view illustrative of a lamination structure of another improved twisted nematic liquid crystal display according to the present invention.

As illustrated in FIG. 12, the liquid crystal display may have the following layered structure. Top and bottom orientations films 31 and 21 are provided on top and bottom surfaces of a liquid crystal layer 12. A top transparent electrode 32 is provided on the top orientation film 31. A bottom transparent electrode 22 is provided on the bottom orientation film 21. A top glass substrate 33 is provided on the top transparent electrode 32. A bottom glass substrate 23 is provided on the bottom transparent electrode 22. A top polarization plate 34 is provided over the top glass substrate 33 so that the top polarization plate 34 is spaced apart via a small gap from the top glass substrate 33 An optical compensation layer 11 is provided under the bottom glass substrate 23 so that the optical compensation layer 11 is spaced apart via a small gap from the bottom glass substrate 23. A bottom polarization plate 24 is provided under the optical compensation layer 11 so that the bottom polarization plate 24 is spaced apart via a small gap from the optical compensation layer 11. As a result, the optical compensation layer 11 is disposed between the bottom glass substrate 23 and the bottom polarization plate 24 via the small gaps. The liquid crystal layer 12 has four different domains which differ both in the twisted direction and the tilting up direction of the liquid crystal molecules as illustrated in FIG. 13.

Figure 14:
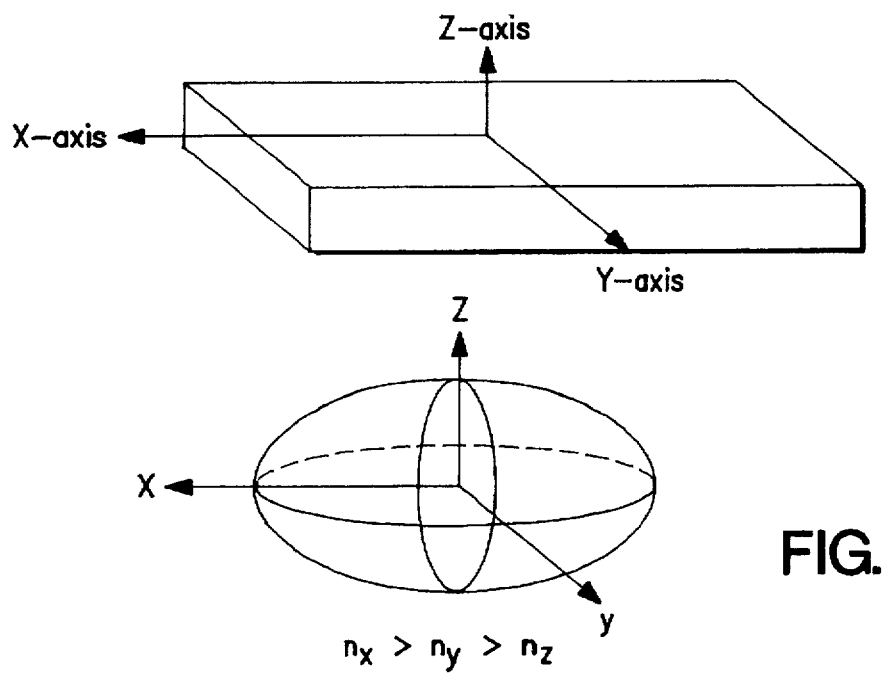
FIG. 14 is a view illustrative of an optical property of an optical compensation layer having a bi-axial refractive anisotropy, which is used in another improved twisted nematic liquid crystal display according to the present invention.

With reference to FIG. 14, the optical property of the optical compensation layer 11 will be described. The optical compensation layer 11 has the bi-axial refractive anisotropy which has three different refractive indexes $n_x$, $n_y$, $n_z$ which satisfy the relationship of $n_x > n_y > n_z$ where $n_x$ is the refractive index in a direction parallel to an X-axis parallel to a surface of the optical compensation layer, $n_y$ is the refractive index in a direction parallel to a Y-axis parallel to a surface of the optical compensation layer and perpendicular to the X-axis, and $n_z$ is the refractive index in a direction parallel to a Z-axis perpendicular to a surface of the optical compensation layer.

Figure 13:
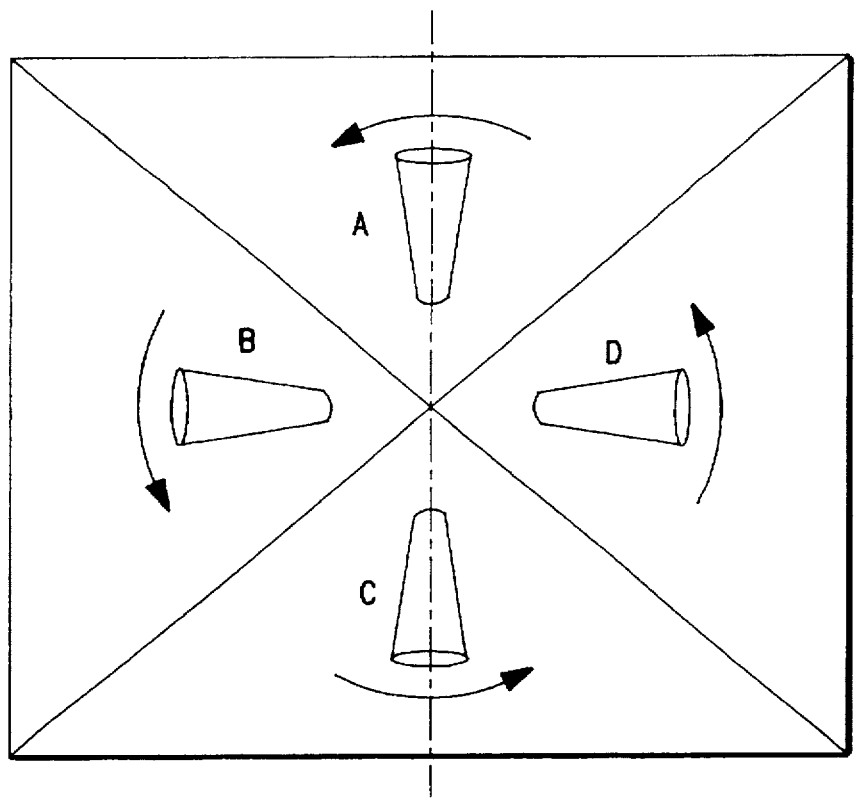
FIG. 13 is a view illustrative of co-existing four different domains which differ both in the twisting direction and in the tilting up direction of twisted nematic liquid crystal molecules in another improved twisted nematic liquid crystal display according to the present invention.

It is effective to use the above optical compensation layer for improvements in the view angle dependency of the liquid crystal display including the liquid crystal layer which has four different domains which differ both in the twisted direction and the tilting up direction of the liquid crystal molecules as illustrated in FIG. 13. The reason of those will be apparent from the following descriptions. The liquid crystal molecules in each domain are ordered and have the same twisting direction and tilting up direction of the liquid crystal molecules when the voltage is applied to the liquid crystal, whilst the twisting direction and the tilting up direction of the liquid crystal molecules are different between the different domains in the liquid crystal layer. It is not easy to compensate individual domains, for which reason the optical compensation layer 11 has bi-axial refractive anisotropy and further the orientation films 21 and 31 are treated by rubbing in individual directions so that if the optical compensation layer has an in-plane anisotropy, it is possible to select the direction parallel or vertical to the rubbing direction thereby obtaining the optimal view angle property.

As described above, each pixel has the four different domains which differ both in the twisting direction and the tilting up direction of the liquid crystal molecules. If the four different domains are positioned diagonally and have the same area, the different optical properties of the diagonally positioned domains are canceled so that wide viewing angle property and fine picture are obtained.

EMBODIMENTS

Figure 15:
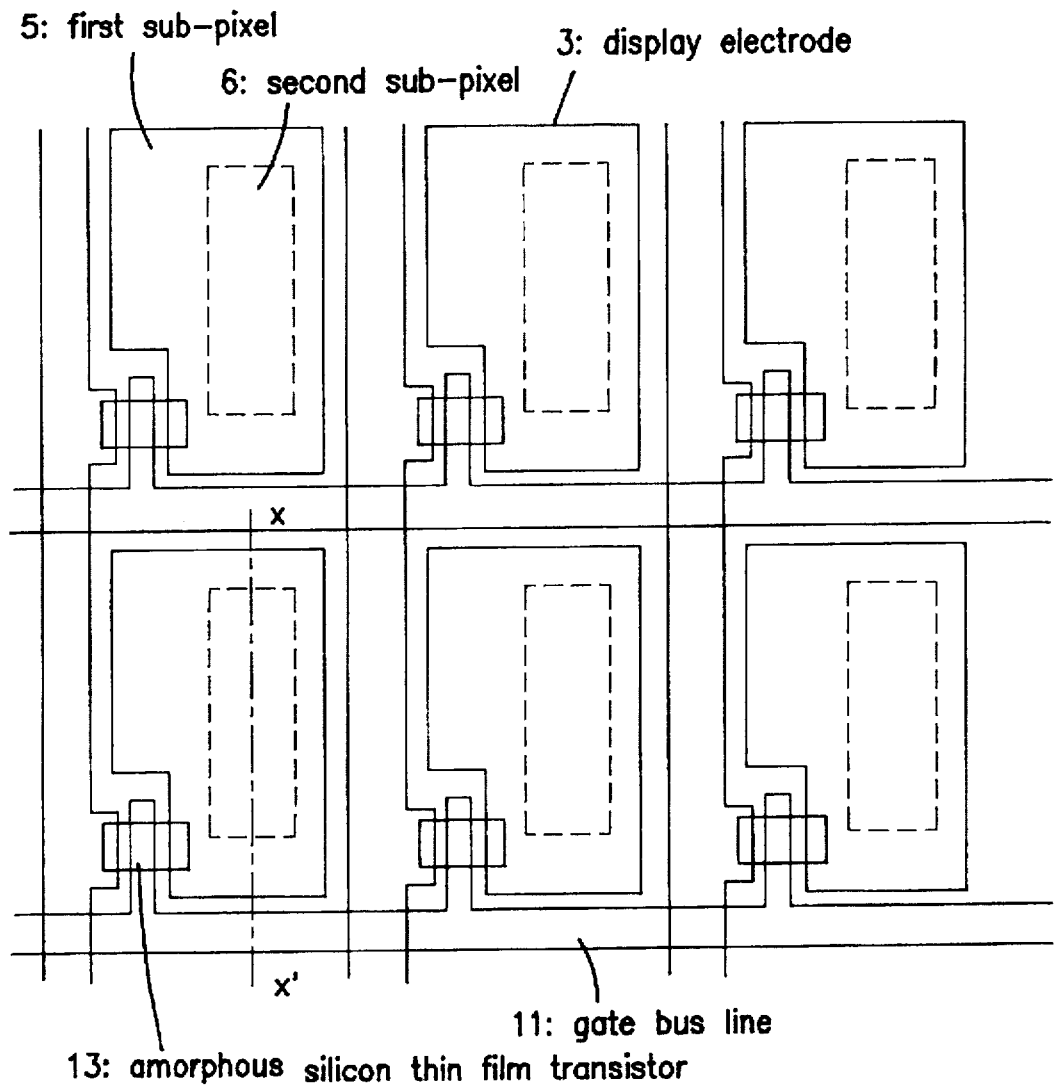
FIG. 15 is a diagram illustrative of a structure of pixels in an improved twisted nematic liquid crystal display in a first embodiment according to the present invention.

A first embodiment according to the present invention will be described with reference to FIG. 15. An amorphous silicon thin film transistor array with a pixel size of 200 micrometers×50 micrometers is used. In this amorphous silicon thin film transistor array, display electrodes 3 are coated with amorphous silicon nitride layers 4 differing in thickness. Namely, the amorphous silicon nitride layers 4 have two different thickness which divide each of the display electrodes 3 into a first sub-pixel 5 and a second sub-pixel 6. The amorphous silicon nitride layers 4 serves as a capacitor which is electrically coupled in series to a capacitor of the liquid crystal, for which reason different voltages are applied to the first and second sub-pixels 5 and 6.

Figure 16:
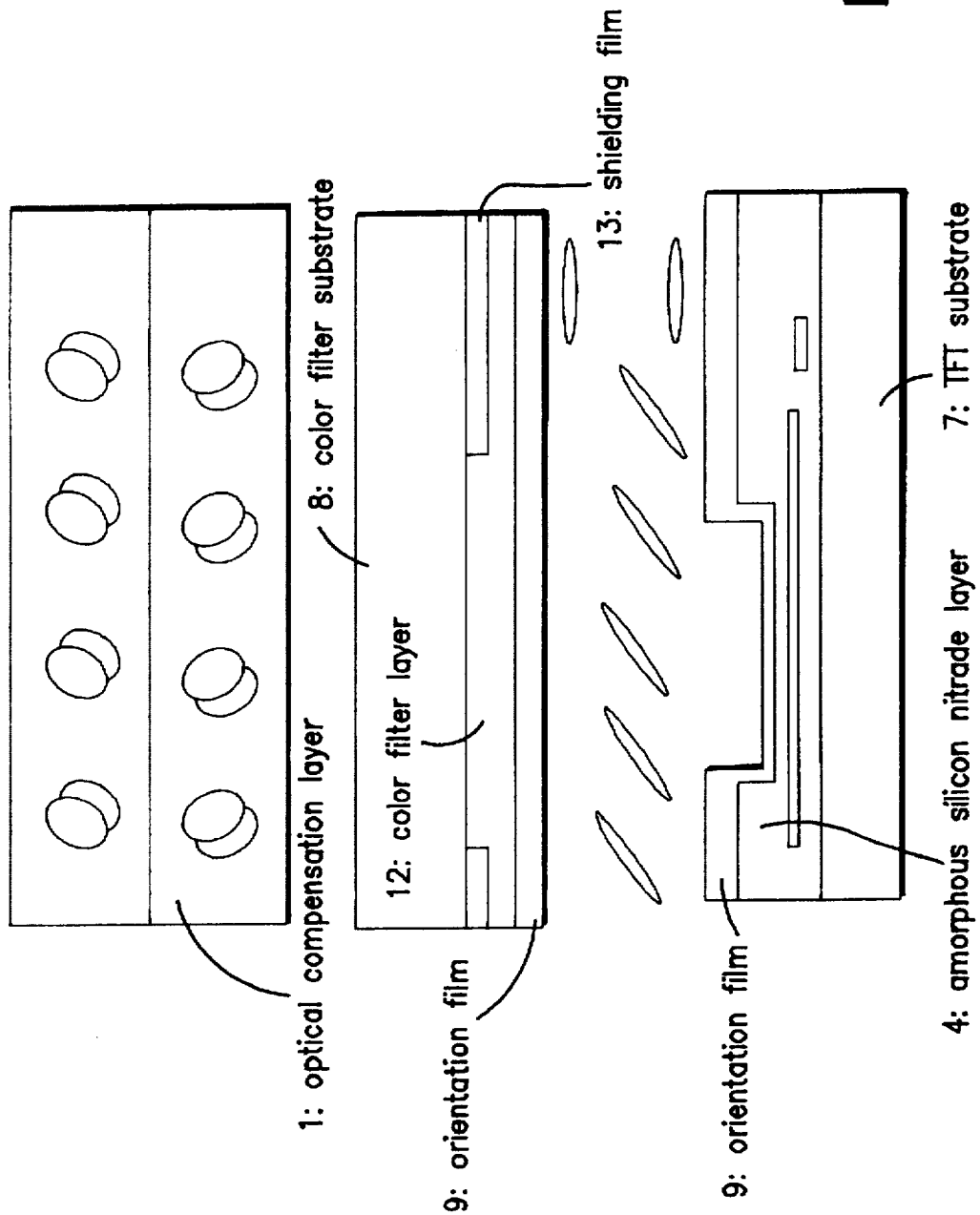
FIG. 16 is a fragmentary cross sectional elevation view illustrative of a lamination structure of an improved twisted nematic liquid crystal display in a first embodiment according to the present invention.

With reference to FIG. 16, a liquid crystal panel comprises a thin film transistor substrate 7 and a color filter substrate 8, both of which are bonded via spacers of 6 micrometers. On the color filter substrate 8, a color filter layer 12 is provided, which has shielding layers partially formed. On the color filter 12, the orientation film 9 is provided, which have been treated by rubbing. On the thin film transistor substrate 7, the amorphous silicon nitride layer 4 is provided, which have different thickness as illustrated in FIG. 16, for which reason a surface of the amorphous silicon nitride layer 4 has a recessed portion where the amorphous silicon nitride layer 4 has a smaller thickness. The other orientation film 9 treated with rubbing is also provided on the surface of the amorphous silicon nitride layer 4. The liquid crystal layer is sandwiched between the orientations films 9 respectively provided over the color filter substrate 8 and the thin film transistor substrate 7. The color filter substrate 8 and the thin film transistor substrate 7 are bonded so that the rubbing directions of the orientation films 9 are different from each other by 90 degrees. A nematic liquid crystal ZLI-4792 is injected under vacuum into a gap between the orientation films 9 provided over the color filter substrate 8 and the thin film transistor substrate 7.

Further, an optical compensation layer 1 is provided on an exposed surface of the color filter substrate 8 so that the color filter substrate 8 is disposed between the optical compensation layer 1 and the liquid crystal layer. The optical compensation layer 1 may be prepared as follows.

A phase difference film is prepared, which has a refractive index in a direction perpendicular to the surface of the film and another refractive index in a direction parallel to the surface of the film wherein the refractive index in the direction perpendicular to the surface is smaller than the refractive index in the direction parallel to the surface. The phase difference film is made sandwiched between hot iron plates heated to a temperature of 180° C. to be applied with a shearing stress. The thickness of the phase difference film is approximately 100 micrometers.

An ellipsometer is used to measure the direction of the optical axis of the optical compensation film and confirm that the optical axis tilts by approximately 20 degrees from the normal axis of the surface of the film.

Two of the above films are laminated to be prepared over the color filter substrate 8.

The first one of the optical compensation films is provided on the color filter substrate 8 so that the direction in which the shearing force is applied to the film is parallel to the direction of rubbing to which the orientation film 9 on the color filter substrate 8 is subjected whereby the optical axis of the optical compensation layer tilts toward the same direction as the tilting up direction of the liquid crystal molecules oriented by the orientation film 9 on the color filter substrate 8. The other optical compensation film is provided on the first one of the optical compensation films so that the direction in which the shearing force is applied to the film is parallel to the direction of rubbing to which the orientation film 9 on the thin film transistor substrate 7 is subjected whereby the optical axis of the optical compensation layer tilts toward the same direction as the tilting up direction of the liquid crystal molecules oriented by the orientation film 9 on the thin film transistor substrate 7. Polarization plates are provided to sandwich the above lamination structure so that the double layered optical compensation layers 1 are disposed between the color filter substrate 8 and the polarization plate.

Figure 17:
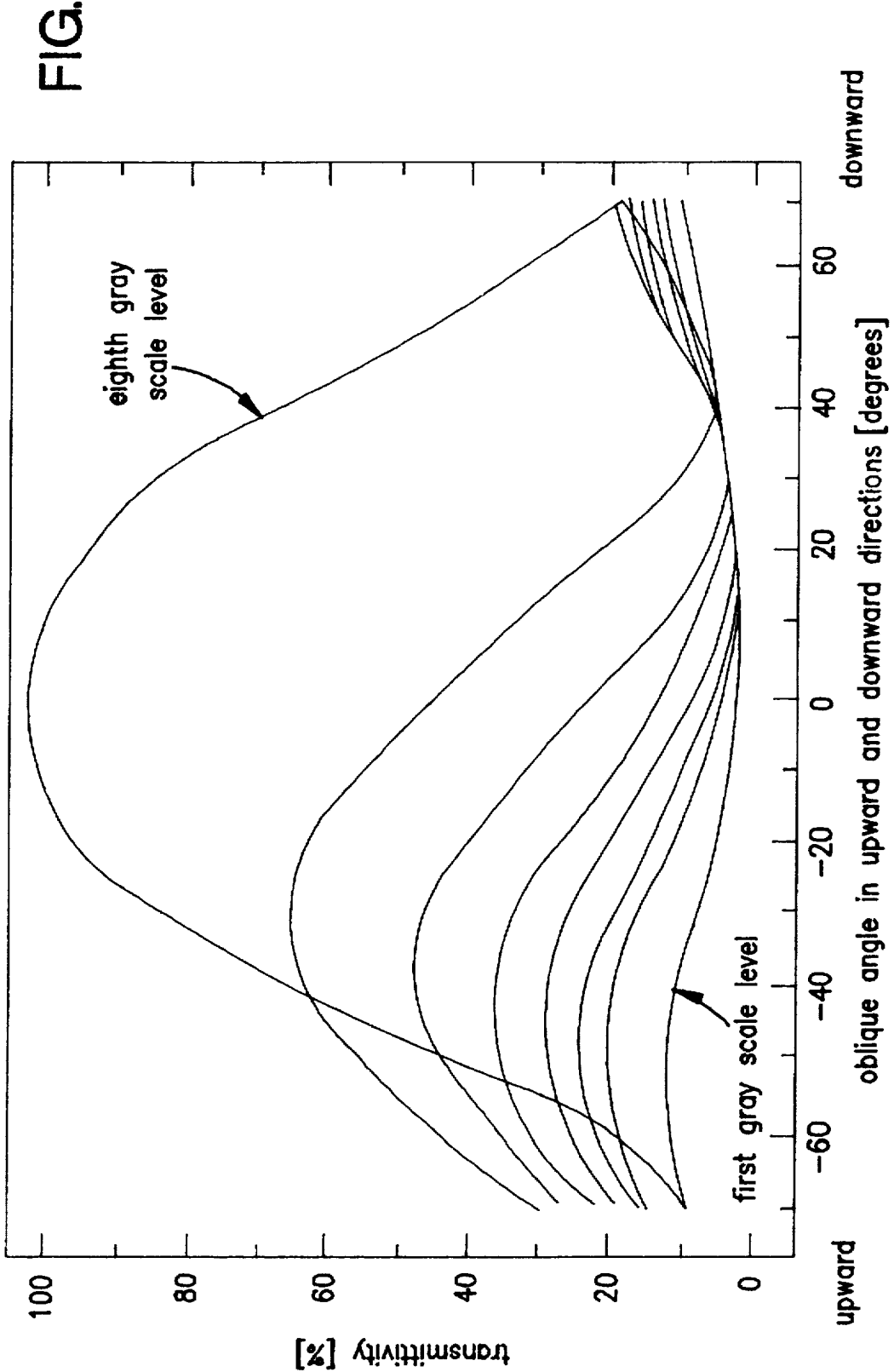
FIG. 17 is a diagram illustrative of variations in transmittivity for every eight gray scales over oblique angle upward and downward directions of a twisted nematic liquid crystal in an improved twisted nematic liquid crystal display in a first embodiment according to the present invention.

The view angle dependency of the liquid crystal panel with the optical compensation layer is measured. The measurement results are illustrated in FIG. 17 which is illustrative of the transmittivity over the tilting angle upward and downward directions. Individual transmittivity of the liquid crystal panel with the optical compensation layer in eight gray scales is illustrated. From FIG. 17, it can be understood that the transmittivity of the first gray scale level has a relatively small variation and a relatively small view angle dependency.

Figure 18:
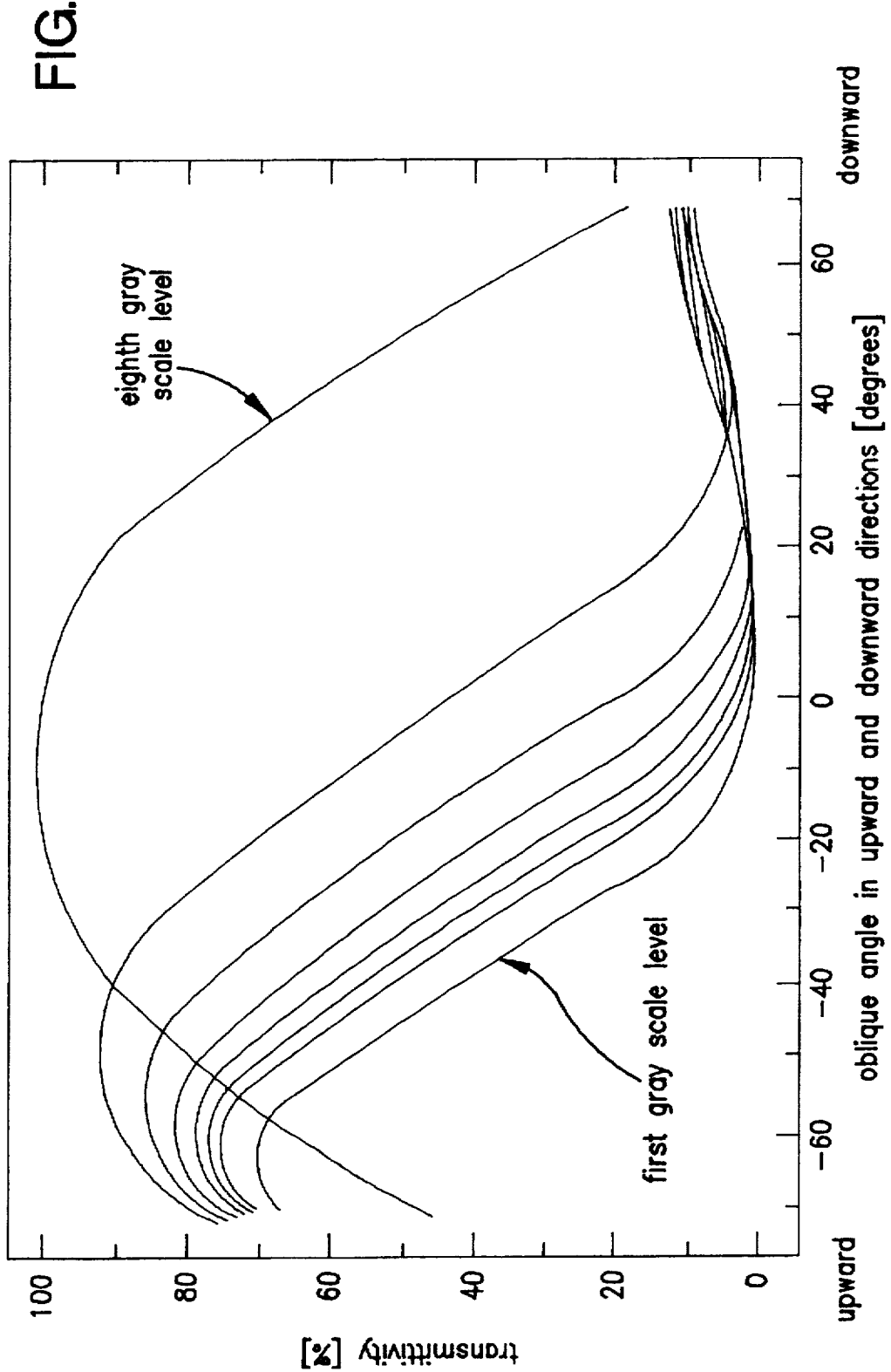
FIG. 18 is a diagram illustrative of variations in transmittivity for every eight gray scales over oblique angle upward and downward directions of a twisted nematic liquid crystal in a twisted nematic liquid crystal display in a first comparative example.

As a comparative example to the first embodiment as described above, the liquid crystal panel is prepared but which has no optical compensation layer. The view angle dependency of the liquid crystal panel with the optical compensation layer is also measured. The measurement results are illustrated in FIG. 18 which is illustrative of the transmittivity over the tilting angle upward and downward directions. Individual transmittivity of the liquid crystal panel with the optical compensation layer in eight gray scales is illustrated. From FIG. 18, it can be understood that the transmittivity of the first gray scale level has a relatively large variation and a relatively large view angle dependency.

Figure 19:
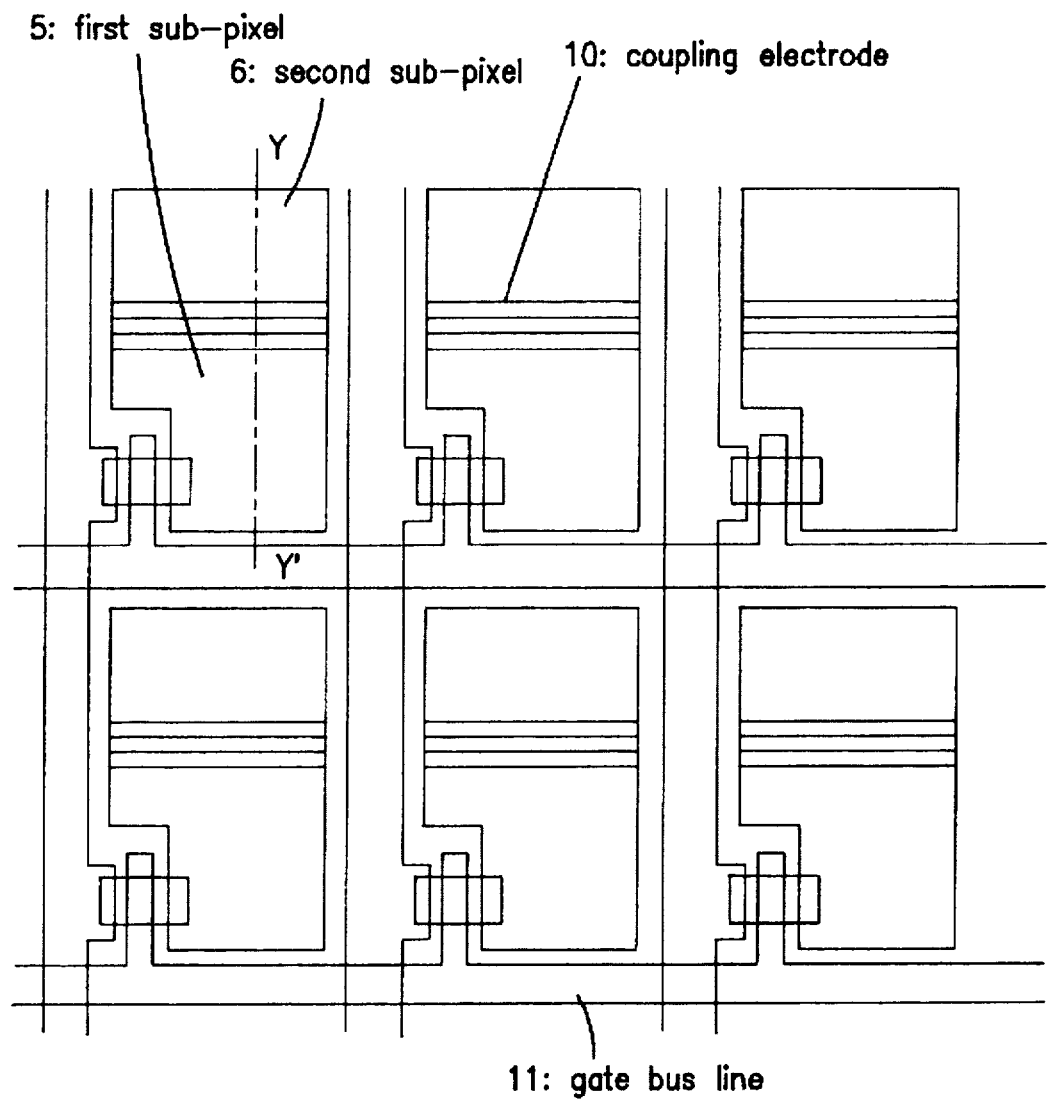
FIG. 19 is a diagram illustrative of a structure of pixels in an improved twisted nematic liquid crystal display in a second embodiment according to the present invention.

A second embodiment according to the present invention will be described with reference to FIG. 19. An amorphous silicon thin film transistor array with a pixel size of 200 micrometers×50 micrometers is used. In this amorphous silicon thin film transistor array, display electrodes 3 are coated with amorphous silicon nitride layers 4 differing in thickness. Namely, the amorphous silicon nitride layers 4 have two different thickness which divide each of the display electrodes 3 into a first sub-pixel 5 and a second sub-pixel 6. The amorphous silicon nitride layers 4 serves as a capacitor which is electrically coupled in series to a capacitor of the liquid crystal, for which reason different voltages are applied to the first and second sub-pixels 5 and 6.

Figure 20:
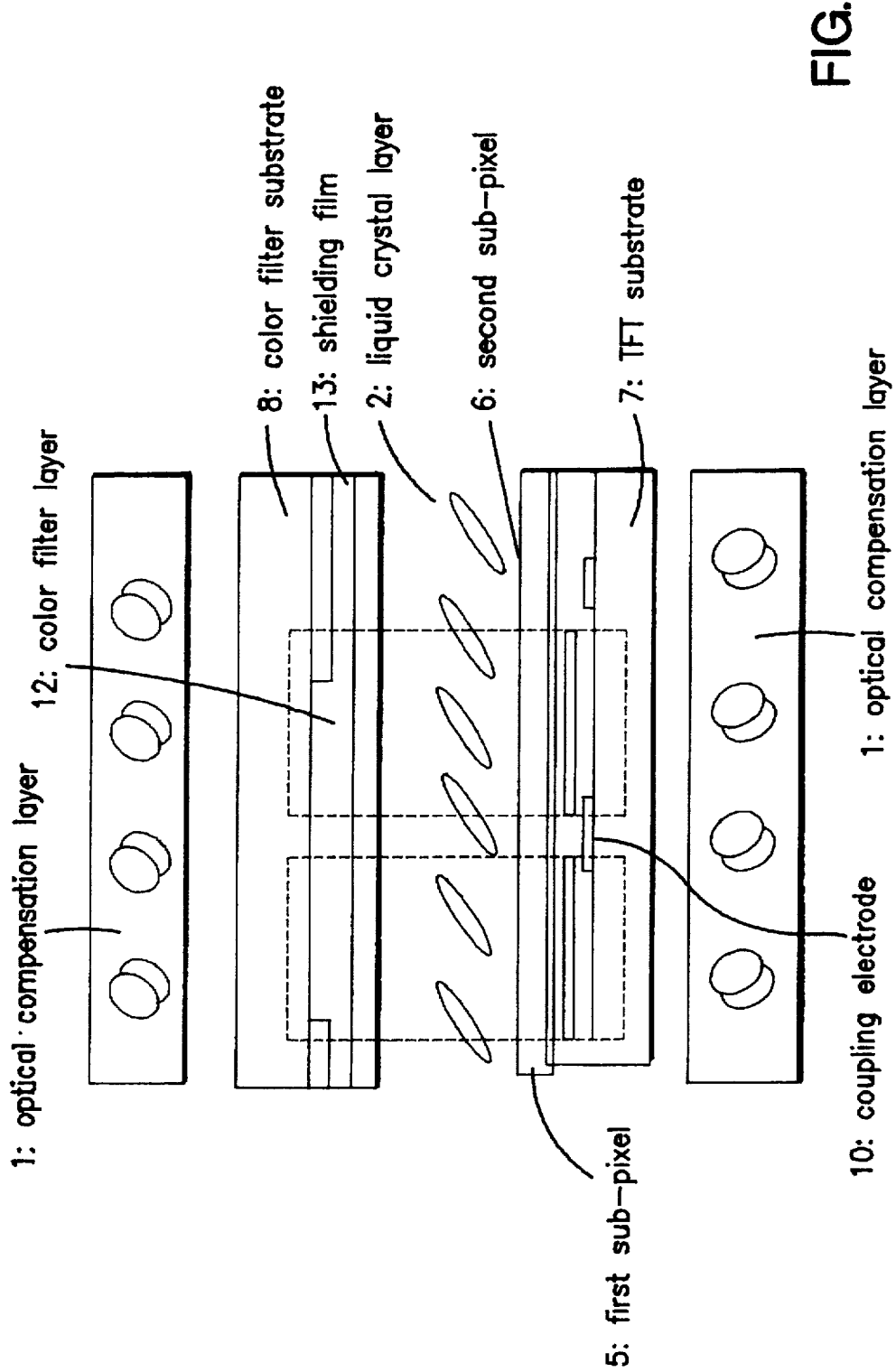
FIG. 20 is a fragmentary cross sectional elevation view illustrative of a lamination structure of an improved twisted nematic liquid crystal display in a second embodiment according to the present invention.

With reference to FIG. 20, a first sub-pixel 5 and a second sub-pixel 6 are represented by broken lines. A liquid crystal panel comprises a thin film transistor substrate 7 and a color filter substrate 8, both of which are bonded via spacers of 6 micrometers. On the color filter substrate 8, a color filter layer 12 is provided, which has shielding layers partially formed. On the color filter 12, the orientation film 9 is provided, which have been treated by rubbing. On the thin film transistor substrate 7, the amorphous silicon nitride layer 4 is provided, which have the same thickness as illustrated in FIG. 20 but both are coupled via a coupling electrode 10 which comprises a part of a gate bus line 11. The other orientation film 9 treated with rubbing is also provided on the surface of the amorphous silicon nitride layer 4. The liquid crystal layer is sandwiched between the orientations films 9 respectively provided over the color filter substrate 8 and the thin film transistor substrate 7. The color filter substrate 8 and the thin film transistor substrate 7 are bonded so that the rubbing directions of the orientation films 9 are different from each other by 90 degrees. A nematic liquid crystal ZLI-4792 is injected under vacuum into a gap between the orientation films 9 provided over the color filter substrate 8 and the thin film transistor substrate 7.

Further, optical compensation layers 1 are provided on exposed surfaces of the color filter substrate 8 and the thin film transistor substrate 7 so that the color filter substrate 8 is disposed between the optical compensation layer 1 and the liquid crystal layer as well as the thin film transistor substrate 7 is disposed between the liquid crystal layer and the optical compensation layer 1. Each of the optical compensation layers 1 may be prepared as follows.

A phase difference film is prepared, which has a refractive index in a direction perpendicular to the surface of the film and another refractive index in a direction parallel to the surface of the film wherein the refractive index in the direction perpendicular to the surface is smaller than the refractive index in the direction parallel to the surface. The phase difference film is made sandwiched between hot iron plates heated to a temperature of 180° C. to be applied with a shearing stress. The thickness of the phase difference film is approximately 100 micrometers.

Two of the above films are provided over the color filter substrate 8 and over the thin film transistor substrate 7.

The first one of the optical compensation films is provided on the color filter substrate 8 so that the direction in which the shearing force is applied to the film is parallel to the direction of rubbing to which the orientation film 9 on the color filter substrate 8 is subjected whereby the optical axis of the optical compensation layer tilts toward the same direction as the tilting up direction of the liquid crystal molecules oriented by the orientation film 9 on the color filter substrate 8. The other optical compensation film is provided over the thin film transistor substrate 7 so that the direction in which the shearing force is applied to the film is parallel to the direction of rubbing to which the orientation film 9 on the thin film transistor substrate 7 is subjected whereby the optical axis of the optical compensation layer tilts toward the same direction as the tilting up direction of the liquid crystal molecules oriented by the orientation film 9 on the thin film transistor substrate 7. Polarization plates are provided to sandwich the above lamination structure so that the optical compensation layers 1 are disposed between the color filter substrate 8 and the polarization plate and between the thin film transistor substrate 9 and the polarization plate.

Figure 21:
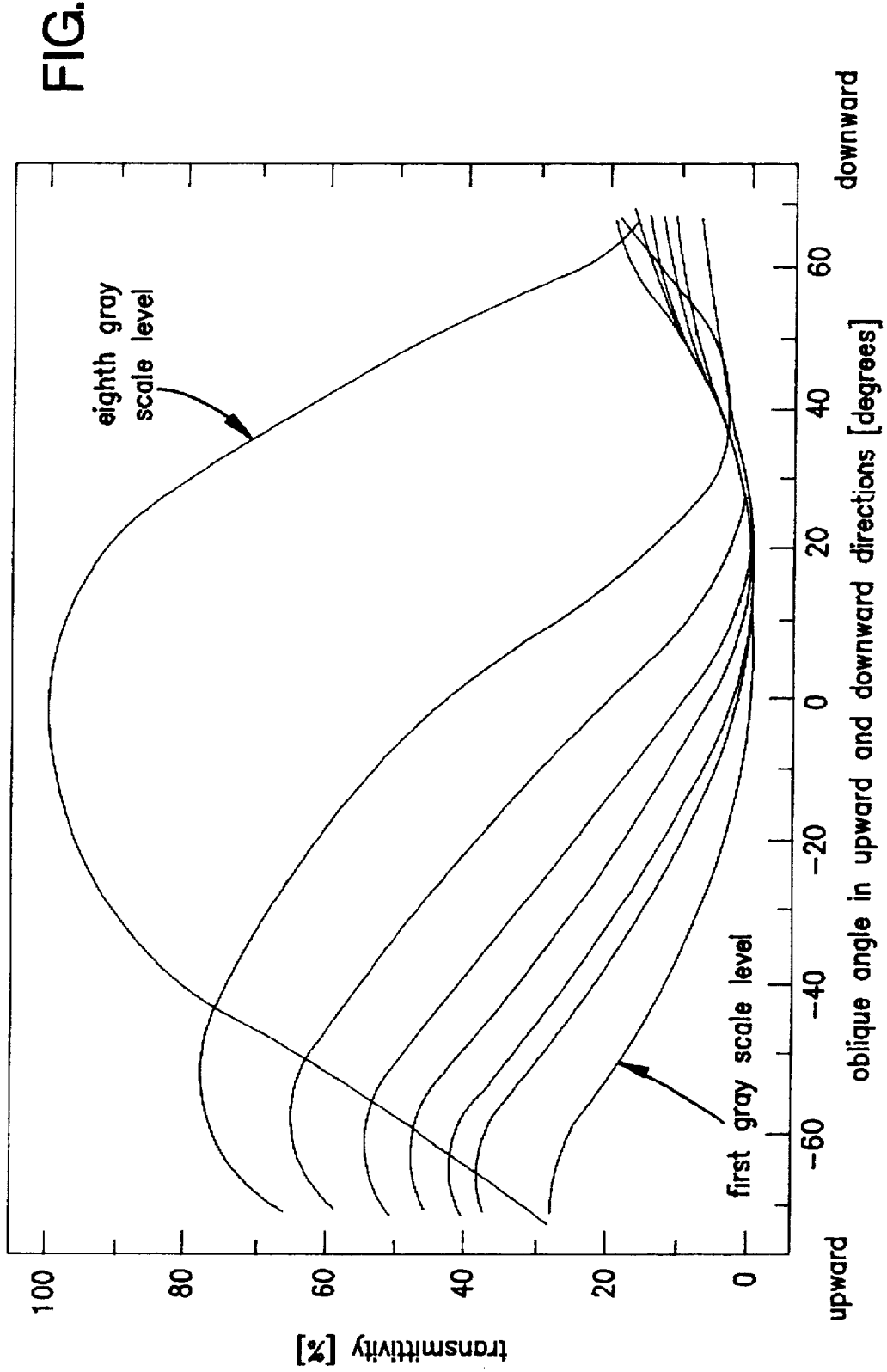
FIG. 21 is a diagram illustrative of variations in transmittivity for every eight gray scales over oblique angle upward and downward directions of a twisted nematic liquid crystal in an improved twisted nematic liquid crystal display in a second embodiment according to the present invention.

The view angle dependency of the liquid crystal panel with the optical compensation layer is measured. The measurement results are illustrated in FIG. 21 which is illustrative of the transmittivity over the tilting angle upward and downward directions. Individual transmittivity of the liquid crystal panel with the optical compensation layer in eight gray scales is illustrated. From FIG. 21, it can be understood that the transmittivity of the first gray scale level has a relatively small variation and a relatively small view angle dependency.

A third embodiment according to the present invention will be described with reference to FIG. 22, wherein a thin film diode array with a pixel size of 210 micrometers×70 micrometers is provided. Signal electrode lines 16 and a coupling electrode 10 made of chromium are selectively formed on a thin film diode substrate 7 so that the signal electrode lines 16 and the coupling electrode 10 are parallel to each other. Silicon nitride films 15 are selectively formed to cover the signal electrode lines 16 and the coupling electrode 10. Transparent electrode patterns 14 made of indium tin oxide are selectively formed. Over the signal electrode line 16, the transparent electrodes 14 are symmetrically formed via the silicon nitride film but separated from each other via a small gap. The first sub-pixel 5 comprises the transparent electrode 14 extending over the silicon nitride film 15 covering the signal electrode line 16, the thin film diode substrate 7 and the silicon nitride film 15 also covering but the coupling electrode 10. The second sub-pixel 6 comprises the other transparent electrode 14 extending over the silicon nitride film 15 covering the coupling electrode 10 and the thin film diode substrate 7. The first and second sub-pixels 5 and 6 are formed almost symmetrically in relation to the signal electrode line 16 so that current-voltage characteristics independent from the polarity of the voltage can be obtained. The first and second sub-pixels 5 and 6 are capacitive-coupling to each other via the coupling electrode 10 so that the first and second sub-pixels 5 and 6 are applied with different voltages.

Figure 22:
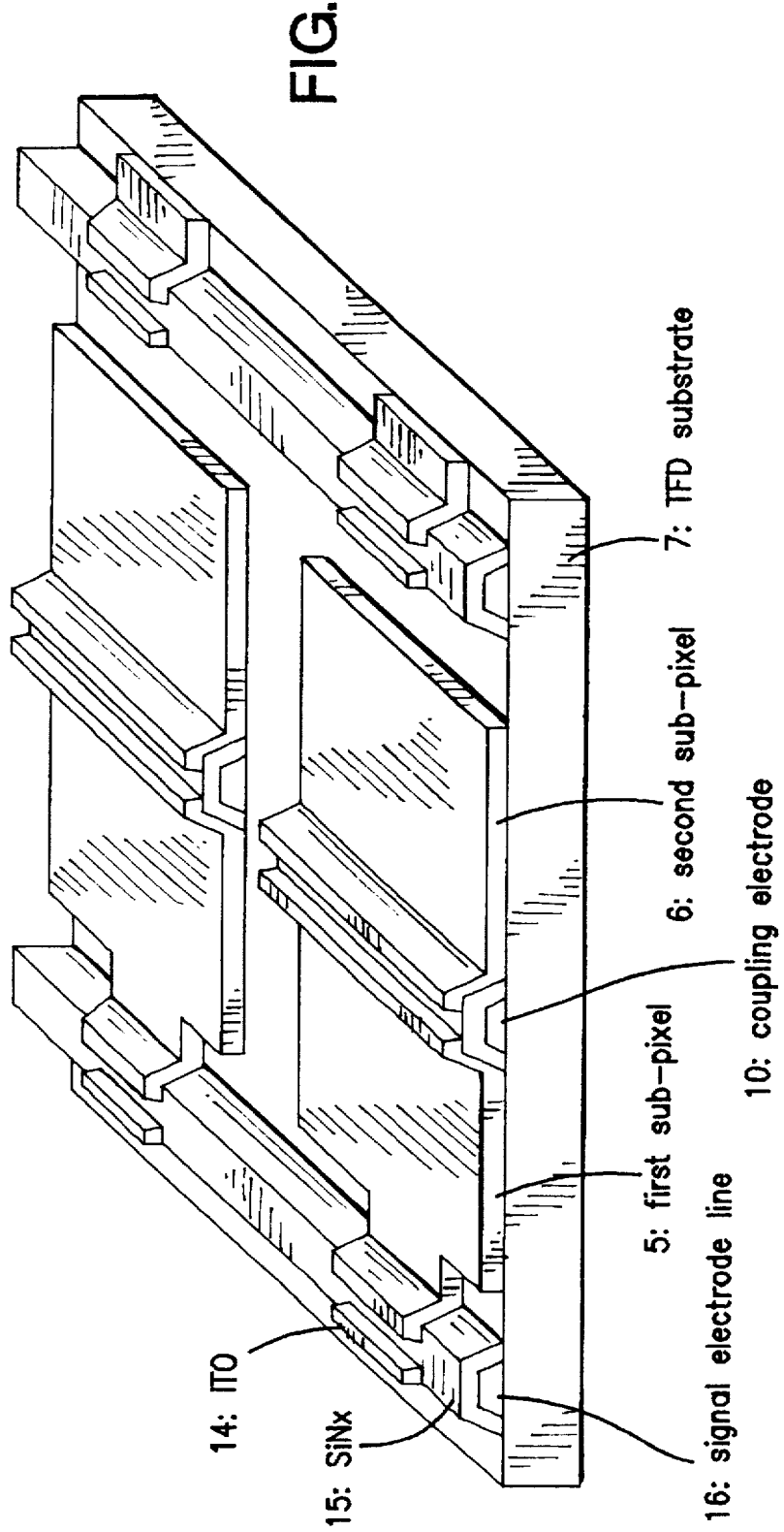
FIG. 22 is a schematic view illustrative of a structure of an improved twisted nematic liquid crystal display in a third embodiment according to the present invention.

On the other hand, scanning electrodes of stripe shape are formed over a color filter substrate not illustrated in FIG. 22. The scanning electrodes comprise indium tin oxide electrodes 14 to thereby form a color filter array. The thin film diode substrate 7 and the color filter substrate are bonded to each other via a spacer of 6 micrometers.

On the thin film diode substrate 7 and the color filter substrate, orientation films are provided, which have been treated by rubbing. The thin film diode substrate 7 and the color filter substrate are bonded so that the orientation films differ in the rubbing direction by 90 degrees from each other. In the vacuum, a nematic liquid crystal is injected into a gap between the thin film diode substrate 7 and the color filter substrate.

Further, optical compensation layers 1 are provided on exposed surfaces of the color filter substrate and the thin film transistor substrate 7 so that the color filter substrate is disposed between the optical compensation layer 1 and the liquid crystal layer as well as the thin film transistor substrate 7 is disposed between the liquid crystal layer and the optical compensation layer 1. Each of the optical compensation layers 1 may be prepared as follows.

A phase difference film is prepared, which has a refractive index in a direction perpendicular to the surface of the film and another refractive index in a direction parallel to the surface of the film wherein the refractive index in the direction perpendicular to the surface is smaller than the refractive index in the direction parallel to the surface. The phase difference film is made sandwiched between hot iron plates heated to a temperature of 180° C. to be applied with a shearing stress. The thickness of the phase difference film is approximately 100 micrometers.

Two of the above films are provided over the color filter substrate and over the thin film transistor substrate 7.

The first one of the optical compensation films is provided on the color filter substrate so that the direction in which the shearing force is applied to the film is parallel to the direction of rubbing to which the orientation film on the color filter substrate is subjected whereby the optical axis of the optical compensation layer tilts toward the same direction as the tilting up direction of the liquid crystal molecules oriented by the orientation film on the color filter substrate. The other optical compensation film is provided over the thin film transistor substrate 7 so that the direction in which the shearing force is applied to the film is parallel to the direction of rubbing to which the orientation film on the thin film transistor substrate 7 is subjected whereby the optical axis of the optical compensation layer tilts toward the same direction as the tilting up direction of the liquid crystal molecules oriented by the orientation film on the thin film transistor substrate 7. Polarization plates are provided to sandwich the above lamination structure so that the optical compensation layers 1 are disposed between the color filter substrate and the polarization plate and between the thin film transistor substrate and the polarization plate.

The view angle dependency of the liquid crystal panel with the optical compensation layer is measured. It could be confirmed that the transmittivity of the first gray scale level has a relatively small variation and a relatively small view angle dependency. As compared to when the thin film transistor substrate is used, each pixel has larger area of the pixel electrodes, for which reason a more bright picture can be obtained.

Figure 23:
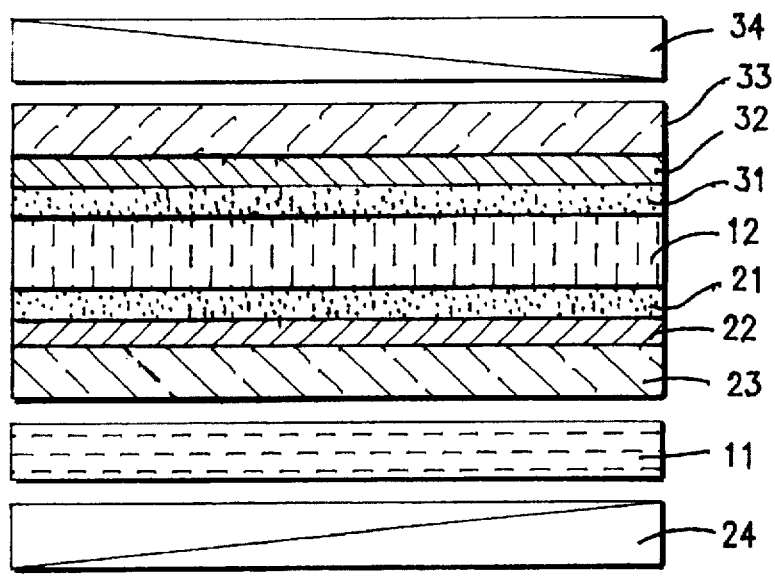
FIG. 23 is a fragmentary cross sectional elevation view illustrative of a lamination structure of another improved twisted nematic liquid crystal display in a fourth embodiment according to the present invention.
Figure 24:
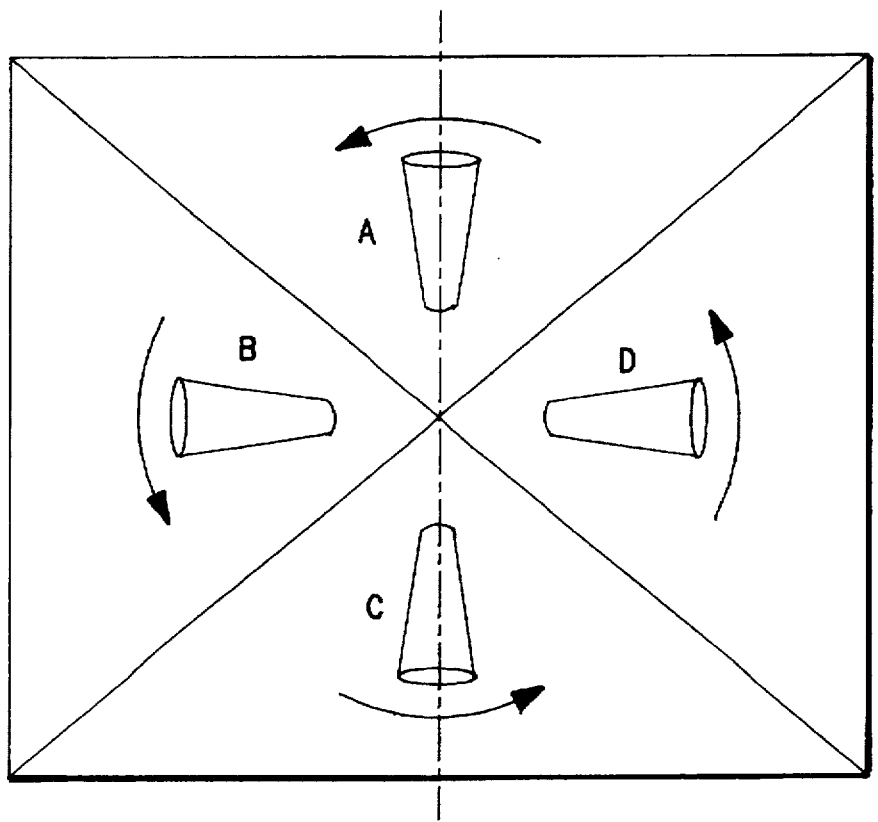
FIG. 24 is a view illustrative of co-existing four different domains which differ both in the twisting direction and in the tilting up direction of twisted nematic liquid crystal molecules in another improved twisted nematic liquid crystal display in a fourth embodiment according to the present invention.
Figure 25A:
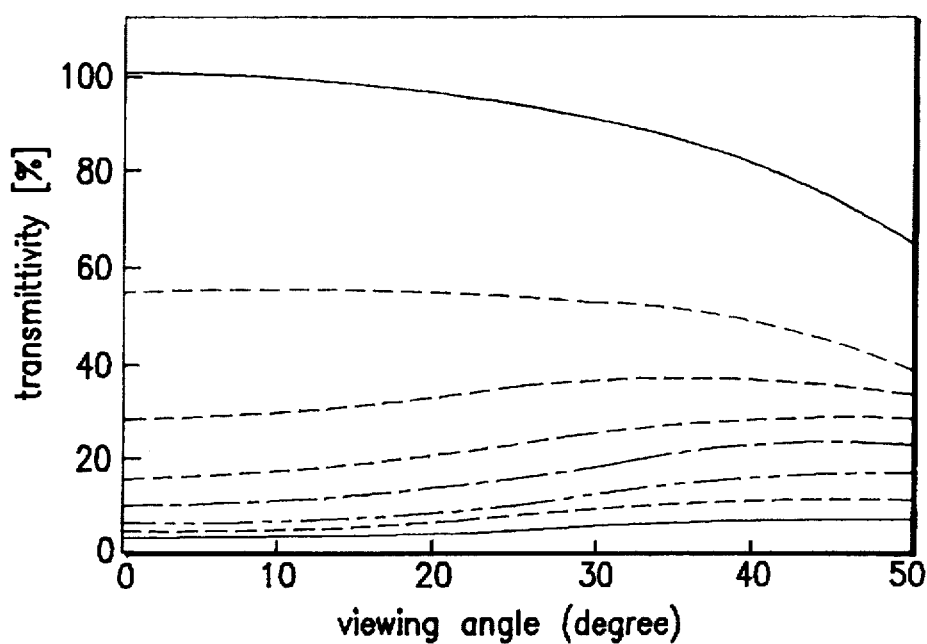
FIG. 25A is a diagram illustrative of variations in transmittivity for every eight gray scales over view angle at an oblique angle of 0 degree from a transmission axis of a polarization plate for a twisted nematic liquid crystal in another improved twisted nematic liquid crystal display in a fourth embodiment according to the present invention.
Figure 25B:
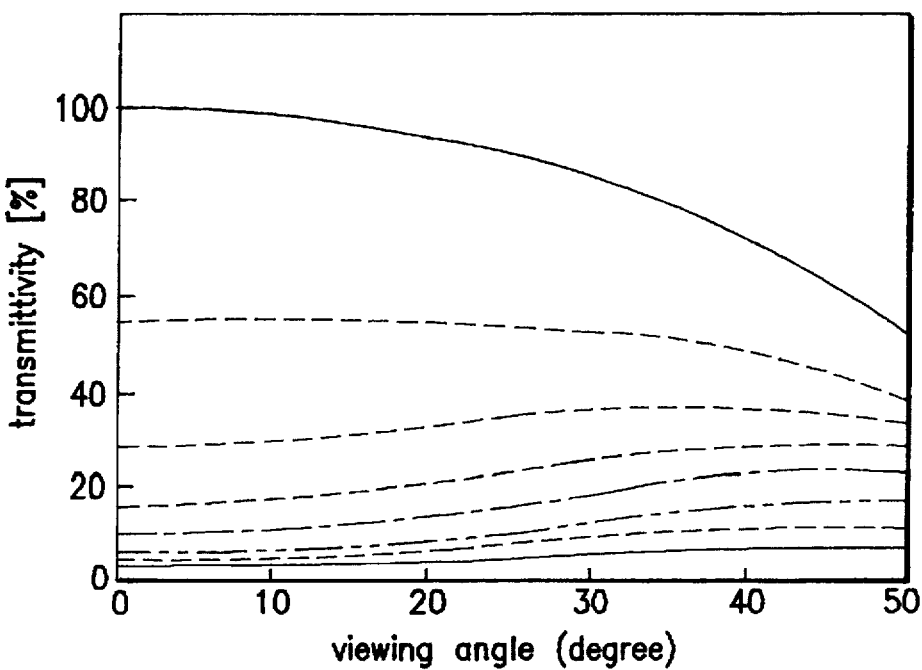
FIG. 25B is a diagram illustrative of variations in transmittivity for every eight gray scales over view angle at an oblique angle of 90 degrees from a transmission axis of a polarization plate for a twisted nematic liquid crystal in another improved twisted nematic liquid crystal display in a fourth embodiment according to the present invention.
Figure 26A:
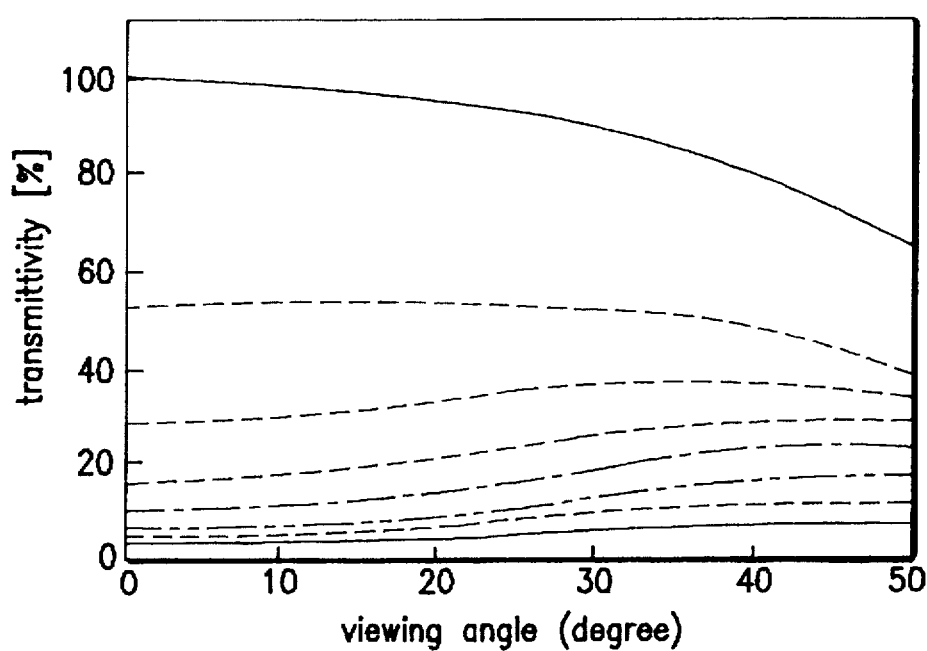
FIG. 26A is a diagram illustrative of variations in transmittivity for every eight gray scales over view angle at an oblique angle of 0 degree from a transmission axis of a polarization plate for a twisted nematic liquid crystal in another improved twisted nematic liquid crystal display in a second comparative example.
Figure 26B:
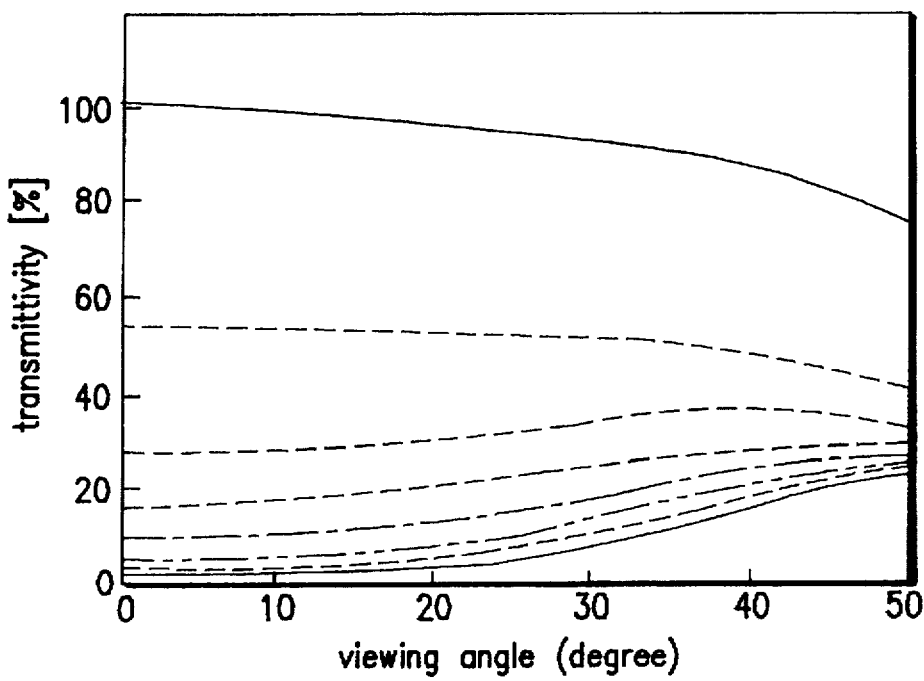
FIG. 26B is a diagram illustrative of variations in transmittivity for every eight gray scales over view angle at an oblique angle of 90 degrees from a transmission axis of a polarization plate for a twisted nematic liquid crystal in another improved twisted nematic liquid crystal display in a second comparative example.

A fourth embodiment according to the other present invention will be described as follows. With reference to FIG. 23, a glass substrate 33 is used, which has a large number of X-shaped openings with a width of 5 micrometers. Another glass substrate 23 is also used as an opposite electrode, which is provided with arrays comprising a large number of pixel electrodes aligned at an interval of 10 micrometers, wherein each the pixel electrode is square-shaped with a size of 100 micrometers and 100 micrometers. Transparent electrodes 22 and 32 are provided on the glass substrates 23 and 33. After cleaning the glass substrates 23 and 33, polyimide orientation agent is applied by spin coating on the transparent electrodes 22 and 32 provided on the glass substrates 23 and 33, and then subjected to sintering processes at temperatures of 90° C. and 220° C. so as to form orientation films 21 and 31 on the transparent electrodes 22 and 32. A buff cloth of rayon is used to subject the orientation films 21 and 31 to the rubbing. The rubbing is made in the diagonal direction of the substrates. The orientation films provided on the substrates differ in rubbing direction by 90 degrees. Adhesive is applied on a peripheral portion of the substrate so that latex spheres with a diameter of 6 micrometers acting as spacers are placed on the adhesive. The substrates are bonded to each other via the spacer under pressure so that an electrode opening portion is positioned at a center of the electrode of a size of 100 micrometers and 100 micrometers.

The substrates bonded to each other are placed in a vacuum vessel for evacuation and subsequent injection of a liquid crystal solution including a namatic liquid crystal ZLI4792 having a phase transition temperature of 92, 0.2 percents by weight of an ultra-violet ray cure monomer KAYARAD PET-30 and 5 percents by weight of an initiator to the monomer to thereby form a liquid crystal layer 12. As a result, the liquid crystal panel is obtained. The liquid crystal panel is heated up to a temperature of 110° C. and then exposed to an ultra-violet ray at 0.1 mW/cm$^2$ for thirty minutes. The panel is applied with a sine-wave voltage of 8V at a frequency of 10 Hz, during which the substrates are cooled down at a rate of 20° C./minute.

The liquid crystal cell obtained is observed by polarization microscope to confirm that each domain is divided into four fine sub-domains in accordance with the X-shaped opening. The four fine sub-domains differ both in the twisting direction and the tilting up direction of the nematic liquid crystal molecules.

An optical compensation film 11 with a bi-axial anisotropy New-VAC-200/240 Film is used. This film has an in-plane retardation of 200 nanometers and a vertical-to-plane retardation of 240 nanometers where the in-plane retardation is given by $(n_x-n_y) \times d$, (d is the thickness of the film).

The optical compensation film 11 is disposed under the glass substrate 22 to be spaced apart therefrom via a small gap. A bottom polarization plate 24 is provided under the optical compensation film 11 to be spaced apart therefrom. A top polarization plate 34 is provided over the top glass substrate 33 to be spaced apart therefrom. The optical axes of the polarization plates and the rubbing direction of the substrate are fixed to observe the optical property under variations in the direction of the optical compensation film but in the black picture upon a voltage application.

Figure 1:
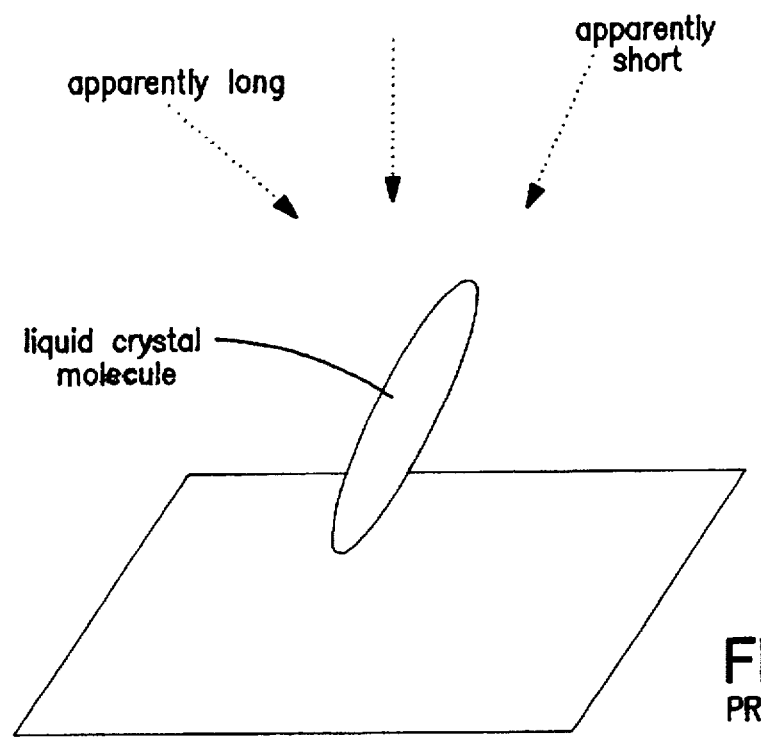
FIG. 1 is a view illustrative of a view angle dependency of a twisted nematic liquid crystal.
Figure 2:
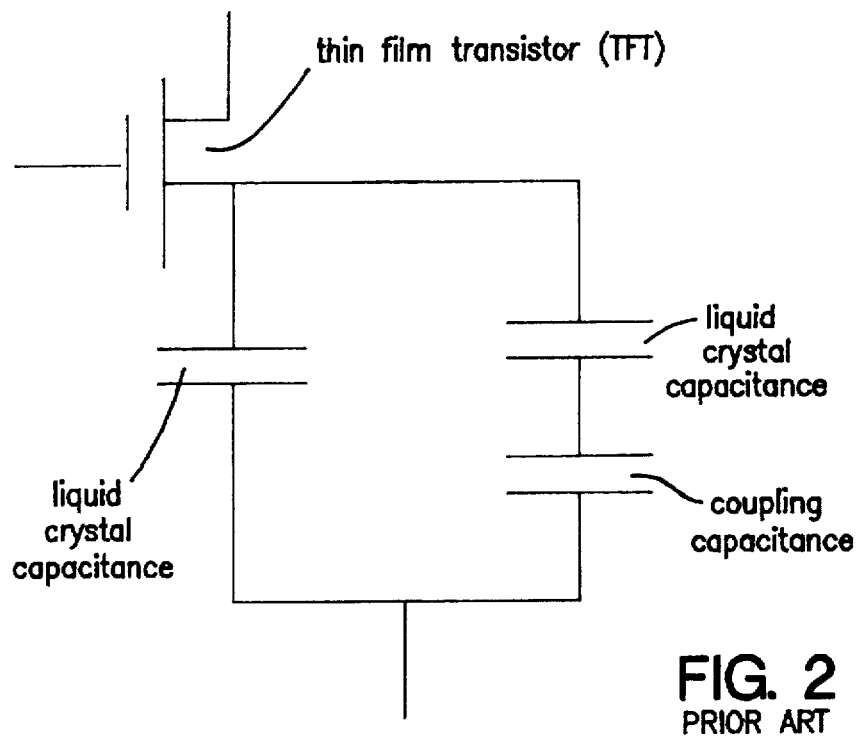
FIG. 2 is a circuit diagram of a circuit configuration having a thin film transistor and a pixel capacitor in each pair of first and second sub-pixels accommodating a twisted nematic liquid crystal in a twisted nematic liquid crystal display.
Figure 3:
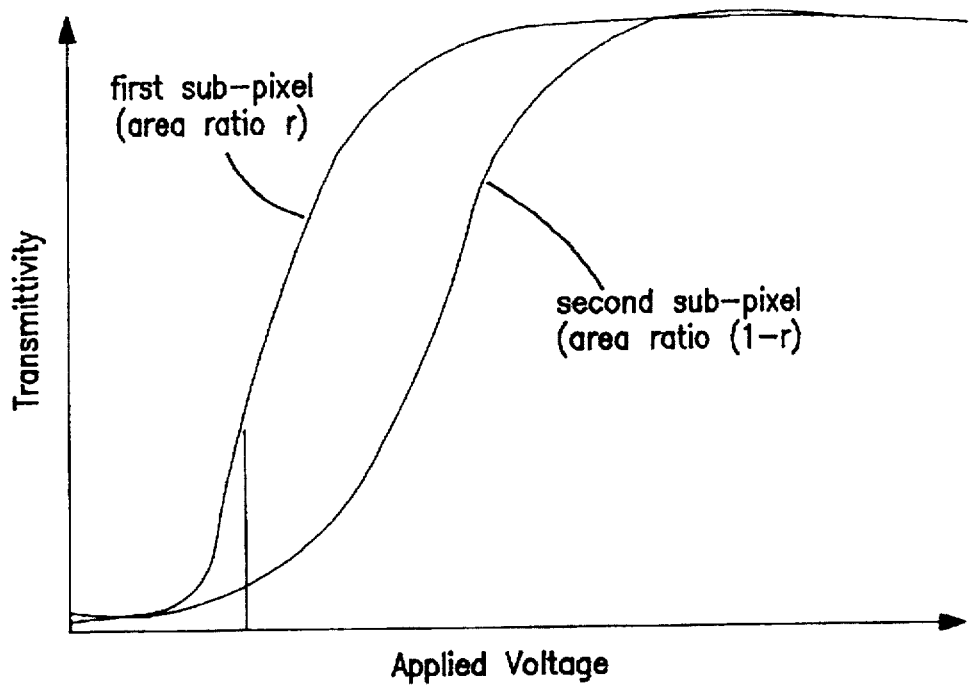
FIG. 3 is a diagram illustrative of variations in transmittivity of a twisted nematic liquid crystal over applied voltage levels in a twisted nematic liquid crystal display having a plurality of pairs of first and second sub-pixels.
Figure 4:
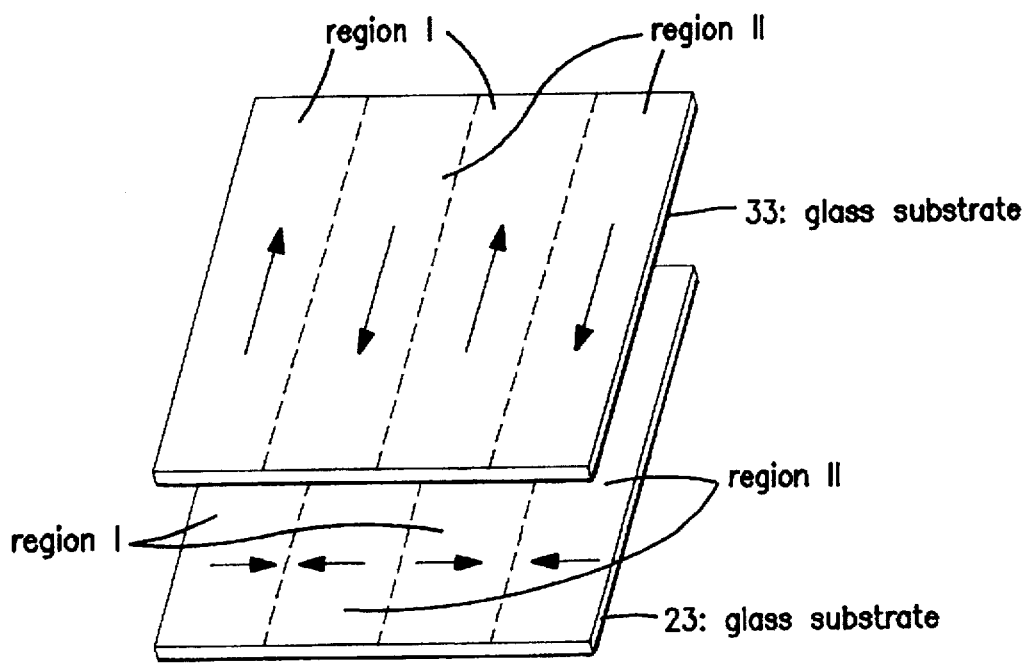
FIG. 4 is a view illustrative of a micro-rubbing technique applied to a pair of top and bottom substrates sandwiching a twisted nematic liquid crystal in a twisted nematic liquid crystal display.

It is confirmed that if the optical axis of the polarization plate is vertical to the refractive index in the direction along the X-axis of the optical compensation film 11, then the best suppression effect for suppression of the whiteness in the oblique direction and at this time the direction of the optical compensation film 11 is fixed for measurement of the view angle dependency of the liquid crystal display by use of liquid crystal evaluator LCD-5000. Since the different sub-domains are positioned diagonally, the same view angle dependency appears for every 90 degrees. The view angle dependency of the transmittivity over an angle 0 degree from the optical axis of the polarization plate for each of the eight gray scales is illustrated in FIG. 4A. The view angle dependency of the transmittivity over an angle 45 degree from the optical axis of the polarization plate for each of the eight gray scales is illustrated in FIG. 4B. From FIGS. 4A and 4B, it can be understood that the variations in the transmittivity of the liquid crystal panel are well suppressed.

A comparative example to the fourth embodiment will be described. The structure of the liquid crystal display is the same as in the fourth embodiment except providing no optical compensation film.

Figure 5:
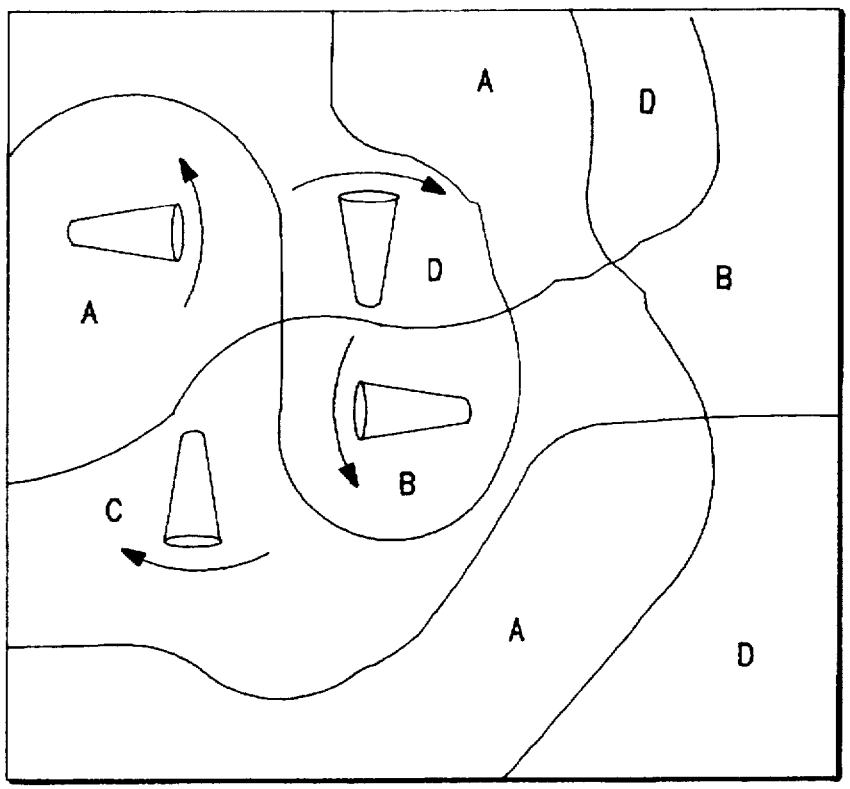
FIG. 5 is a view illustrative of co-existing four different domains which differ both in the twisting direction and in the tilting up direction of the twisted nematic liquid crystal molecules in the twisted nematic liquid crystal display.

The view angle dependency of the liquid crystal display is measured by use of liquid crystal evaluator LCD-5000. Since the different sub-domains are positioned diagonally, the same view angle dependency appears for every 90 degrees. The view angle dependency of the transmittivity over an angle 0 degree from the optical axis of the polarization plate for each of the eight gray scales is illustrated in FIG. 5A. The view angle dependency of the transmittivity over an angle 45 degree from the optical axis of the polarization plate for each of the eight gray scales is illustrated in FIG. 5B. From FIG. 5B, it can be understood that the variations in the transmittivity of the liquid crystal panel are not suppressed.

A fifth embodiment according to the other present invention will be described as follows. With reference again to FIG. 23, a glass substrate 33 is used, which has a large number of X-shaped openings with a width of 5 micrometers. Another glass substrate 23 is also used as an opposite electrode, which is provided with arrays comprising a large number of pixel electrodes aligned at an interval of 10 micrometers, wherein each the pixel electrode is square-shaped with a size of 100 micrometers and 100 micrometers. Transparent electrodes 22 and 32 are provided on the glass substrates 23 and 33. After cleaning the glass substrates 23 and 33, polyimide orientation agent is applied by spin coating on the transparent electrodes 22 and 32 provided on the glass substrates 23 and 33, and then subjected to sintering processes at temperatures of 90° C. and 220° C. so as to form orientation films 21 and 31 on the transparent electrodes 22 and 32. A buff cloth of rayon is used to subject the orientation films 21 and 31 to the rubbing. The rubbing is made in the diagonal direction of the substrates. The orientation films provided on the substrates differ in rubbing direction by 90 degrees. Adhesive is applied on a peripheral portion of the substrate so that latex spheres with a diameter of 6 micrometers acting as spacers are placed on the adhesive. The substrates are bonded to each other via the spacer under pressure so that an electrode opening portion is positioned at a center of the electrode of a size of 100 micrometers and 100 micrometers.

The substrates bonded to each other are placed in a vacuum vessel for evacuation and subsequent injection of a liquid crystal solution including a namatic liquid crystal ZLI4792 having a phase transition temperature of 92, 0.2 percents by weight of an ultra-violet ray cure monomer KAYARAD PET-30 and 5 percents by weight of an initiator to the monomer to thereby form a liquid crystal layer 12. As a result, the liquid crystal panel is obtained. The liquid crystal panel is heated up to a temperature of 110° C. and then exposed to an ultra-violet ray at 0.1 mW/cm$^2$ or thirty minutes. The panel is applied with a sine-wave voltage of 8V at a frequency of 10 Hz, during which the substrates are cooled down at a rate of 20° C./minute.

The liquid crystal cell obtained is observed by polarization microscope to confirm that each domain is divided into four fine sub-domains in accordance with the X-shaped opening. The four fine sub-domains differ both in the twisting direction and the tilting up direction of the nematic liquid crystal molecules.

An optical compensation film 11 with a bi-axial anisotropy New-VAC-200/240 Film is used. This film has an in-plane retardation of 100 nanometers and a vertical-to-plane retardation of 125 nanometers where the in-plane retardation is given by $(n_x-n_y) \times d$, (d is the thickness of the film).

The optical compensation film 11 is disposed under the glass substrate 22 to be spaced apart therefrom via a small gap. A bottom polarization plate 24 is provided under the optical compensation film 11 to be spaced apart therefrom. A top polarization plate 34 is provided over the top glass substrate 33 to be spaced apart therefrom. The optical axes of the polarization plates and the rubbing direction of the substrate are fixed to observe the optical property under variations in the direction of the optical compensation film but in the black picture upon a voltage application. It is confirmed that if the optical axis of the polarization plate is vertical to the refractive index in the direction along the X-axis of the optical compensation film 11, then the best suppression effect for suppression of the whiteness in the oblique direction and at this time the direction of the optical compensation film 11 is fixed for measurement of the view angle dependency of the liquid crystal display by use of liquid crystal evaluator LCD-5000. Since the different sub-domains are positioned diagonally, the same view angle dependency appears for every 90 degrees. The variations in the transmittivity of the liquid crystal panel are well suppressed.

A sixth embodiment according to the other present invention will be described as follows. With reference again to FIG. 23, a glass substrate 33 is used, which has a large number of X-shaped openings with a width of 5 micrometers. Another glass substrate 23 is also used as an opposite electrode, which is provided with arrays comprising a large number of pixel electrodes aligned at an interval of 10 micrometers, wherein each the pixel electrode is square-shaped with a size of 100 micrometers and 100 micrometers. Transparent electrodes 22 and 32 are provided on the glass substrates 23 and 33. After cleaning the glass substrates 23 and 33, polyimide orientation agent is applied by spin coating on the transparent electrodes 22 and 32 provided on the glass substrates 23 and 33, and then subjected to sintering processes at temperatures of 90° C. and 220° C. so as to form orientation films 21 and 31 on the transparent electrodes 22 and 32. A buff cloth of rayon is used to subject the orientation films 21 and 31 to the rubbing. The rubbing is made in the diagonal direction of the substrates. The orientation films provided on the substrates differ in rubbing direction by 90 degrees. Adhesive is applied on a peripheral portion of the substrate so that latex spheres with a diameter of 6 micrometers acting as spacers are placed on the adhesive. The substrates are bonded to each other via the spacer under pressure so that an electrode opening portion is positioned at a center of the electrode of a size of 100 micrometers and 100 micrometers.

The substrates bonded to each other are placed in a vacuum vessel for evacuation and subsequent injection of a liquid crystal solution including a namatic liquid crystal ZLI4792 having a phase transition temperature of 92, 0.2 percents by weight of an ultra-violet ray cure monomer KAYARAD PET-30 and 5 percents by weight of an initiator to the monomer to thereby form a liquid crystal layer 12. As a result, the liquid crystal panel is obtained. The liquid crystal panel is heated up to a temperature of 110° C. and then exposed to an ultra-violet ray at 0.1 mW/cm² for thirty minutes. The panel is applied with a sine-wave voltage of 8V at a frequency of 10 Hz, during which the substrates are cooled down at a rate of 20° C./minute.

The liquid crystal cell obtained is observed by polarization microscope to confirm that each domain is divided into four fine sub-domains in accordance with the X-shaped opening. The four fine sub-domains differ both in the twisting direction and the tilting up direction of the nematic liquid crystal molecules.

An optical compensation film 11 with a bi-axial anisotropy New-VAC-200/240 Film is used. This film has an in-plane retardation of 150 nanometers and a vertical-to-plane retardation of 185 nanometers where the in-plane retardation is given by $(n_x-n_y) \times d$, (d is the thickness of the film).

The optical compensation film 11 is disposed under the glass substrate 22 to be spaced apart therefrom via a small gap. A bottom polarization plate 24 is provided under the optical compensation film 11 to be spaced apart therefrom. A top polarization plate 34 is provided over the top glass substrate 33 to be spaced apart therefrom. The optical axes of the polarization plates and the rubbing direction of the substrate are fixed to observe the optical property under variations in the direction of the optical compensation film but in the black picture upon a voltage application. It is confirmed that if the optical axis of the polarization plate is vertical to the refractive index in the direction along the X-axis of the optical compensation film 11, then the best suppression effect for suppression of the whiteness in the oblique direction and at this time the direction of the optical compensation film 11 is fixed for measurement of the view angle dependency of the liquid crystal display by use of liquid crystal evaluator LCD-5000. Since the different sub-domains are positioned diagonally, the same view angle dependency appears for every 90 degrees. The variations in the transmittivity of the liquid crystal panel are well suppressed.

Whereas modifications of the present invention will be apparent o a person having ordinary skill in the art, to which the invention pertains, it is to be understood that embodiments as shown and described by way of illustrations are by no means intended to be considered in a limiting sense. Accordingly, it is to be intended to cover by claims any modifications of the present invention which fall within the spirit and scope of the present invention.

What is claimed is:

1. A liquid crystal display having a plurality of pairs of top and bottom pixel electrodes, each of which has a plurality of sub-areas to which different voltages are applied, at least one of the top and bottom pixel electrodes having an optical compensation layer which has an optical negative uni-axial structure, and wherein each of the pixel electrodes is divided into sub-areas having different capacitances from each other and without any orientation division depending upon the sub-areas in each of the pixel electrodes.

2. The liquid crystal display as claimed in claim 1, wherein the liquid crystal display uses a twisted nematic liquid crystal.

3. The liquid crystal display as claimed in claim 1, wherein the optically negative axis of the optical compensation layer tilts an axis normal to the surface of the optical compensation layer.

4. The liquid crystal display as claimed in claim 3, comprising two of the optical compensation layers over a top substrate so that the direction of each of their respective optical axes almost correspond to the direction of the liquid crystal when a voltage is applied to the liquid crystal.

5. The liquid crystal display as claimed in claim 3, comprising two of the optical compensation layers under a bottom substrate so that the direction of each of their respective optical axes almost correspond to the direction of the liquid crystal when a voltage is applied to the liquid crystal.

6. The liquid crystal display as claimed in claim 3, comprising two of the optical compensation layers both over a top substrate and under their respective optical axes almost correspond to the direction of the liquid crystal when a voltage is applied to the liquid crystal.

7. The liquid crystal display as claimed in claim 3, comprising two of the optical compensation layers over a top substrate so that the mean direction of their respective optical axes almost correspond to the direction of the liquid crystal when a voltage is applied to the liquid crystal.

8. The liquid crystal display as claimed in claim 3, comprising two of the optical compensation layers under a bottom substrate so that the mean direction of their respective optical axes almost correspond to the direction of the liquid crystal when a voltage is applied to the liquid crystal.

9. The liquid crystal display as claimed in claim 3, comprising two of the optical compensation layers both over a top substrate and under a bottom substrate respectively so that the mean direction of their respective optical axes almost correspond to the direction of the liquid crystal when a voltage is applied to the liquid crystal.

10. A liquid crystal display including:
   a normally white mode liquid crystal layer which has co-existing different domains differing in a twisted direction and in a tilting up direction of liquid crystal molecules; and
   at least an optical compensation layer having a bi-axial refractive anisotropy between the liquid crystal layer and a polarization plate,
   wherein the bi-axial refractive anisotropy of the optical compensation layer has three different refractive indexes $n_x$, $n_y$, $n_z$ which satisfy a relationship of $n_x > n_y > n_z$ where $n_x$ is a refractive index in a direction parallel to an X-axis parallel to a surface of the optical compensation layer, $n_y$ is a refractive index in a direction parallel to a Y-axis, parallel to a surface of the optical compensation layer and perpendicular to the X-axis, and $n_z$ is a refractive index in a direction parallel to a Z-axis perpendicular to a surface of the optical compensation layer.

11. The liquid crystal display as claimed in claim 10, wherein the liquid crystal display has co-existing four different domains which differ in a twisted direction and a tilting up direction of liquid crystal molecules.

12. The liquid crystal display as claimed in claim 10, wherein a pair of transparent substrates is provided so that the substrates are parallel to each other and have respective surfaces facing to each other and being provided with transparent electrodes and orientation films which have different rubbing directions by 90 degrees from each other.

13. The liquid crystal display as claimed in claim 10, wherein the liquid crystal display comprises:

top and bottom orientations films provided on top and bottom surfaces of a liquid crystal layer;

a top transparent electrode provided on the top orientation film;

a bottom transparent electrode provided on the bottom orientation film;

a top glass substrate provided on the top transparent electrode;

a bottom glass substrate provided on the bottom transparent electrode;

a top polarization plate provided over the top glass substrate so that the top polarization plate is spaced apart via a small gap from the top glass substrate, an optical compensation layer provided under the bottom glass substrate so that the optical compensation layer is spaced apart via a small gap from the bottom glass substrate; and a bottom polarization plate provided under the optical compensation layer so that the bottom polarization plate is spaced apart via a small gap from the optical compensation layer.

* * * * *